(12) United States Patent
Hoyt

(10) Patent No.: US 6,270,322 B1
(45) Date of Patent: Aug. 7, 2001

(54) INTERNAL COMBUSTION ENGINE DRIVEN HYDRAULIC PUMP

(76) Inventor: Steven W. Hoyt, 13711 Yockey St., Garden Grove, CA (US) 92644

( * ) Notice: Subject to any disclaimer, the term of this patent is extended or adjusted under 35 U.S.C. 154(b) by 0 days.

(21) Appl. No.: 09/334,937

(22) Filed: Jun. 17, 1999

Related U.S. Application Data

(63) Continuation-in-part of application No. 09/146,908, filed on Sep. 4, 1998, now abandoned, which is a continuation-in-part of application No. PCT/US98/18460, filed on Sep. 4, 1998.

(51) Int. Cl.[7] .............................. F02B 53/00; F04B 17/05
(52) U.S. Cl. ....................... 417/355; 123/18 A; 417/364
(58) Field of Search ............................ 60/595; 123/18 R, 123/18 A; 417/11, 338, 355, 364

(56) References Cited

U.S. PATENT DOCUMENTS

| | | |
|---|---|---|
| 3,525,216 | 8/1970 | Phillips . |
| 3,595,014 | 7/1971 | McMaster . |
| 3,702,746 * | 11/1972 | Parmerlee ........................ 123/18 R |
| 3,989,011 | 11/1976 | Takahashi . |
| 3,990,406 | 11/1976 | Sogge . |
| 4,027,475 * | 6/1977 | Folsom ............................. 123/18 R |
| 4,166,438 | 9/1979 | Gottschalk ........................ 123/43 R |
| 4,382,748 | 5/1983 | Vanderlaan ............................ 417/11 |
| 4,399,654 | 8/1983 | David ................................... 60/595 |
| 4,561,252 | 12/1985 | David ................................... 60/595 |
| 4,702,205 | 10/1987 | David ................................ 123/236 |
| 5,070,825 | 12/1991 | Morgan ............................. 123/43 A |
| 5,147,193 | 9/1992 | Larsen ................................. 418/68 |
| 5,327,857 | 7/1994 | Howell ............................. 123/46 R |
| 5,433,176 | 7/1995 | Blount ............................. 123/45 A |
| 5,634,779 | 6/1997 | Eysymontt ......................... 417/342 |

FOREIGN PATENT DOCUMENTS

| | | | |
|---|---|---|---|
| 2019769 * | 11/1970 | (DE) | ............................ 123/18 R |
| 90/01676 | 2/1990 | (WO) . | |

* cited by examiner

Primary Examiner—Michael Koczo
(74) Attorney, Agent, or Firm—Pennie & Edmonds LLP

(57) ABSTRACT

A reciprocating rotating engine having a combustion chamber and a pumping chamber is provided with two sets of free pistons and pumps vanes each set having two pistons and two pump vanes. The two sets of pistons and pump vanes define four separate combustion chamber portions and pumping chamber portions and reciprocally rotate in concentric circular paths under the force of compression ignited internal combustion forces, pumping and pressurizing hydraulic fluid contained within the pumping chamber.

6 Claims, 19 Drawing Sheets

US 6,270,322 B1

INTERNAL COMBUSTION ENGINE DRIVEN HYDRAULIC PUMP

REFERENCE TO RELATED APPLICATIONS

This application is a continuation-in-part of U.S. application Ser. No. 09/146,908 filed Sep. 4, 1998, abandoned, and CIP of international application number PCT/U.S. 98/18460 filed Sep. 4, 1998.

TECHNICAL FIELD

The present invention relates to combustion engines. Specifically, the present invention relates to non-fixed compression ratio, compression ignition, two-stroke, rotating/reciprocating, internal combustion engines that convert combustion energy into direct hydraulic work.

BACKGROUND ART

Conventional internal combustion engines use two different processes, constant volume and constant pressure. The constant volume process is characteristic of spark-ignition engines or the Otto cycle. A spark ignition engine uses volatile liquid fuels such as gasoline, compression ratios from 6:1 to 12:1, and compression pressures from 1034 to 2068 kPa. Engine load and speed are controlled by throttling the fuel charge. The constant pressure process is typified by diesel engines or compression ignition engines. A compression ignition engine uses low volatility liquid fuels from fuel oil to crude oil, compression ratios from 11.5:1 to 22:1, and compression pressures from 2768 to 4830 kPa. Engine load and speed are controlled by varying the fuel quantity injected.

Three general types of arrangements of engines are used, four stroke, two stroke, and rotary or Wankel engines. These engines are typically fixed piston engines. That is, the pistons have a predetermined and constant or fixed stroke. This stroke is set up for the particular type of fuel to be used in the engine. Moreover, the pistons are connected through a connecting rod to a crankshaft in order to convert the combustion energy into mechanical work. The crankshaft in turn is used to drive all of the other systems of the automobile or machine. So, the nature of these engines is to produce net mechanical shaft work.

Numerous innovations for combustion engines have been attempted to improve the efficiency, and hence output or work, of an engine without adding undue cost or size. Engines exist that combine the rotation of a rotary engine with the reciprocation of pistons. For example, U.S. Pat. No. 3,990,406 discloses a roto-reciprocating engine arranged to provide an engine that has a large cubic inch displacement per pound of unit weight and therefore a good horsepower to weight ratio. The engine includes a chamber, a piston in the chamber mounted on a crankshaft, and an orientation member arranged to make it possible for the piston to orbit around the crankshaft center while remaining in a substantially oriented position.

U.S. Pat. No. 5,433,176 discloses a rotary-reciprocal combustion engine. The engine includes a rotor which has circular pistons on the lateral peripheral area of the rotor and which is reciprocatively mounted on a rotor with a shaft centrally located in a fixed housing having a cavity formed by a circular peripheral wall and two sidewalls. The circular pistons or sealing mechanisms or apparatus reciprocate on the peripheral area of the rotor while rotating with the rotor and shaft. U.S. Pat. No. 5,070,825 discloses a rotary engine with a wobble plate and a plurality of pistons reciprocating within cylinders.

U.S. Pat. No. 4,166,438 is directed to a machine with reciprocating pistons and a rotating piston carrier. The engine overcomes sealing deficiencies of rotary engines by using conventional pistons. The engine includes a housing surrounding a workshaft, a carrier in the housing about the shaft and rotatable about the shaft axis, a plurality of continuous walls within the carrier each defining a chamber, and a piston in each chamber connected to a crankshaft where each crankshaft is linked to the housing to induce relative movement between the housing and the carrier. Induced motion of the pistons results in a revolution of throw arms of the cranks, causing motion of the gears with respect to the timing gear, thus imposing rotational motion on the carrier and shaft.

Other engines use a free piston arrangement, wherein the stroke of the piston is not set by attachment to a shaft of predetermined length. U.S. Pat. Nos. 4,399,654, 4,561,252, and 4,702,205 disclose such engines. Further, in these engines, the combusted gas exhaust is used to turn vanes in a motor to produce shaft power. U.S. Pat. No. 3,989,011 discloses a constant pressure heating vane engine. This engine uses a system similar to a gas turbine to generate shaft work.

U.S. Pat. No. 5,327,857 discloses a vehicle using a crankless, unthrottled internal combustion engine directly powering its wheels hydrostatically. The vehicle uses a spark or compression ignited two-cycle type engine, an optional recovery and reuse of a portion of its braking energy, and hydraulic pressure for compression of the air and fuel mixture. U.S. Pat. No. 4,382,748 discloses an opposed piston type free piston engine pump for converting combustion energy into hydraulic power. The motion of the engine is at least substantially directly delivered to hydraulic pumping elements, usually, without crankshaft and connecting rod arrangements of conventional rotary engines. The engine includes a pump piston and engine pistons arranged for linear in-line reciprocation wherein the hydraulic pump portion supplies energy for effecting a compression stroke to bring the engine pistons toward one another thereby to effect compression.

SUMMARY OF THE INVENTION

In accordance with the present invention a reciprocating rotating internal combustion engine is provided having a more direct conversion of combustible gases into hydraulic pressure. The reciprocating rotating engine utilizes a non-fixed compression ratio free piston having a compression ignited two-stroke reciprocating and rotating cycle. This arrangement permits multi-fuel use.

The reciprocating rotating internal combustion engine for producing direct hydraulic work includes a combustion assembly housing, a combustion chamber disposed within the combustion housing, at least one free piston disposed within the combustion chamber and dividing the combustion chamber into at least a first combustion chamber portion and a second combustion chamber portion, the free piston moveable between a first piston position and a second piston position, a pumping assembly housing, a pumping chamber disposed within the pumping housing, and at least one pump vane disposed within the pumping chamber and dividing the pumping chamber into at least a first pumping chamber and a second pumping chamber, the pump vane coupled to the free piston so as to be moveable therewith between a first pump position and a second pump position corresponding to the first and second piston positions respectively. The free piston reciprocates between the first and second piston positions under a combustion event force in either one of the first or second combustion chambers to compress combustion gases in the other one of the first or second combustion chambers and to move the pump vane between the first and second pump vane positions to drive a working fluid through the pumping chamber.

In one embodiment, the at least one piston and the at least one pump vane in moving between their respective first and second positions follow concentric circular paths. In another embodiment, the circular pump vane path is nested within the circular piston path and the at least one piston and the at least on pump vane are arranged about a common axis. Preferably, the combustion event is caused by compression ignition of fuel gases disposed within the combustion chamber.

The engine further includes at least one exhaust port per combustion chamber portion for passively exhausting combustion gases. The engine also includes at least one combustion chamber injection port per combustion chamber portion for injecting fuel gases into the combustion chamber portions. In one embodiment, the at least one pump vane in reciprocating between the first and second pump positions simultaneously fills one of the pumping chamber portions with the working fluid and pressurizes the working fluid in the other pumping chamber portion. In another embodiment, the engine includes a plurality of check valves to direct the flow of the working fluid through the pumping chamber.

In one embodiment, the engine includes at least two pairs of pistons arranged to define at least four combustion chamber portions, and at least two pairs of pump vanes arranged to define at least four pumping chamber portions. In another embodiment, the combustion housing is cylindrical and has an outer housing radius, the at least four combustion chamber portions are disposed in a first ring concentric with the combustion housing, and the at least four pump chambers are disposed in a second ring concentric with the housing. In yet another embodiment, the first ring is disposed within the outer housing radius and the second ring is disposed within the first ring.

In one embodiment, each pair of pistons are attached to one pair of pump vanes to form combined piston and pump vane pairs, the combined pairs are collinear and transverse to the axis of common rotation and are rotatable with respect thereto, and the at least four combustion chamber portions and pumping chamber portions are disposed around the circle between adjacent pistons and pump vanes respectively.

The engine further includes at least two rotors, each rotor includes one of the combined pairs and a portion of the pumping housing such that when all of the rotors are combined, a complete pumping chamber is formed. In one embodiment, the pairs of pistons reciprocally rotate with respect to one another so as to sequentially compress and expand the combustion chamber portions in pairs disposed on either side of each piston, and the pump vanes reciprocally rotate with respect to one another so as to sequentially intake and pressurize the working fluid in pump chamber portions disposed on either side of each pump vane. In another embodiment, each pump vane includes at least one check valve such that as the pump vanes rotate the check valve directs hydraulic fluid either alternatively into pumping chamber portions disposed on either side of each pump vane or out of pumping chambers portions disposed on either side of each pump vane. In yet another embodiment, each piston reciprocally rotates within the combustion chamber through an angle of up to about 70°.

In one embodiment, the engine further includes one exhaust port per combustion chamber portion and one combustion chamber injection port per combustion chamber portion, wherein the exhaust ports are equally spaced around the combustion chamber at an angular separation of up to about 90°, each injection port is equally spaced around the combustion chamber at an angular separation of up to about 90°, and the exhaust and injection or intake ports are equally spaced from one another by an angle of up to about 45°. In another embodiment, each injection port includes a valve, at least one of the combined pairs is connected to a sequencing shaft, and the sequencing shaft and the valves are operatively connected so as to synchronize the rotation of the pistons and the opening and closing of the injection valves. In yet another embodiment, each cycle of the engine comprises two strokes and at least four power strokes. In still yet another embodiment, the engine includes a starter mechanism coupled to the at least one free piston and capable of moving the free piston between the first and second pistons positions so as to initiate a self-sustaining engine cycle.

The present invention is also directed to an engine for producing direct hydraulic work having a housing having at least one combustion chamber disposed with the housing, at least one piston disposed within the combustion chamber and dividing the combustion chamber into at least a first combustion chamber portion and a second combustion chamber portion, the piston moveable between a first piston position and a second piston position, at least one fuel intake port disposed in the housing to allow passage of fuel into the first and second combustion chamber portions, a pumping chamber disposed within the housing, and at least one pump vane disposed within the pumping chamber and dividing the pumping chamber into at least a first pumping chamber portion and a second pumping chamber portion, the pump vane coupled to the piston so as to be moveable therewith between a first pump position and a second pump position corresponding to the first and second piston positions respectively. The piston is dimensioned and configured so as to reciprocate between the first and second piston positions under an alternating combustion event force in either one of the first or second combustion chambers to compress combustion gases in the other one of the first or second combustion chambers and to move the pump vane between the first and second pump vane positions to drive a working fluid through the pumping chamber. The engine also includes at least one exhaust port disposed in the housing to allow for the exit of combustion gases.

In another embodiment, the combustion event is caused by compression ignition of fuel gases disposed within the combustion chamber. In one preferred embodiment, the engine also includes at least two pairs of pistons arrange to define at least four combustion chamber portions, and at least two pairs of pump vanes arranged to define at least four pumping chamber portions. In another preferred embodiment, each pair of pistons are attached to one pair of pump vanes to form combined piston and pump vane pairs. The combined pairs are collinear and transverse to an axis of common rotation and are rotatable with respect to the axis of common rotation. In this embodiment, the at least four combustion chamber portions and pumping chamber portions are disposed around the axis of common rotation between adjacent pistons and pump vanes respectively.

In yet another preferred embodiment, the engine includes one exhaust port per combustion chamber portion and one combustion chamber intake port per combustion chamber portion, wherein the exhaust ports are equally spaced about the combustion, each intake port is equally spaced about the combustion chamber, and the exhaust and intake ports are equally spaced from one another. In still yet another preferred embodiment, each intake port includes a valve, and at least one of the combined pairs is connected to a sequencing shaft. In this embodiment, the sequencing shaft and the valves are operatively connected so as to synchronize the rotation of the pistons and the opening and closing of the intake valves.

The present invention is further directed to an engine for producing direct hydraulic work having a housing having at least one combustion chamber disposed with the housing, at least one piston disposed within the combustion chamber and dividing the combustion chamber into at least a first combustion chamber portion and a second combustion chamber portion, the piston moveable between a first piston position and a second piston position, at least one fuel intake port disposed in the housing to allow passage of fuel into the first and second combustion chamber portions, a pumping chamber disposed within the housing, and at least one pump vane disposed within the pumping chamber and dividing the pumping chamber into at least a first pumping chamber portion and a second pumping chamber portion, the pump vane coupled to the piston so as to be moveable therewith between a first pump position and a second pump position corresponding to the first and second piston positions respectively. The piston is dimensioned and configured so as to reciprocate between the first and second piston positions under an alternating combustion event force in either one of the first or second combustion chambers to compress combustion gases in the other one of the first or second combustion chambers and to move the pump vane between the first and second pump vane positions to drive a working fluid through the pumping chamber. The engine also includes at least one exhaust port disposed in the housing to allow for the exit of combustion gases and a starter mechanism coupled to the at least one piston and capable of moving the piston between the first and second pistons positions so as to initiate a self-sustaining engine cycle.

BRIEF DESCRIPTION OF THE DRAWINGS

Preferred features of the present invention are disclosed in the accompanying drawings, wherein similar reference characters denote similar elements throughout the several views, and wherein.

DETAILED DESCRIPTION OF THE INVENTION

Figure 1:
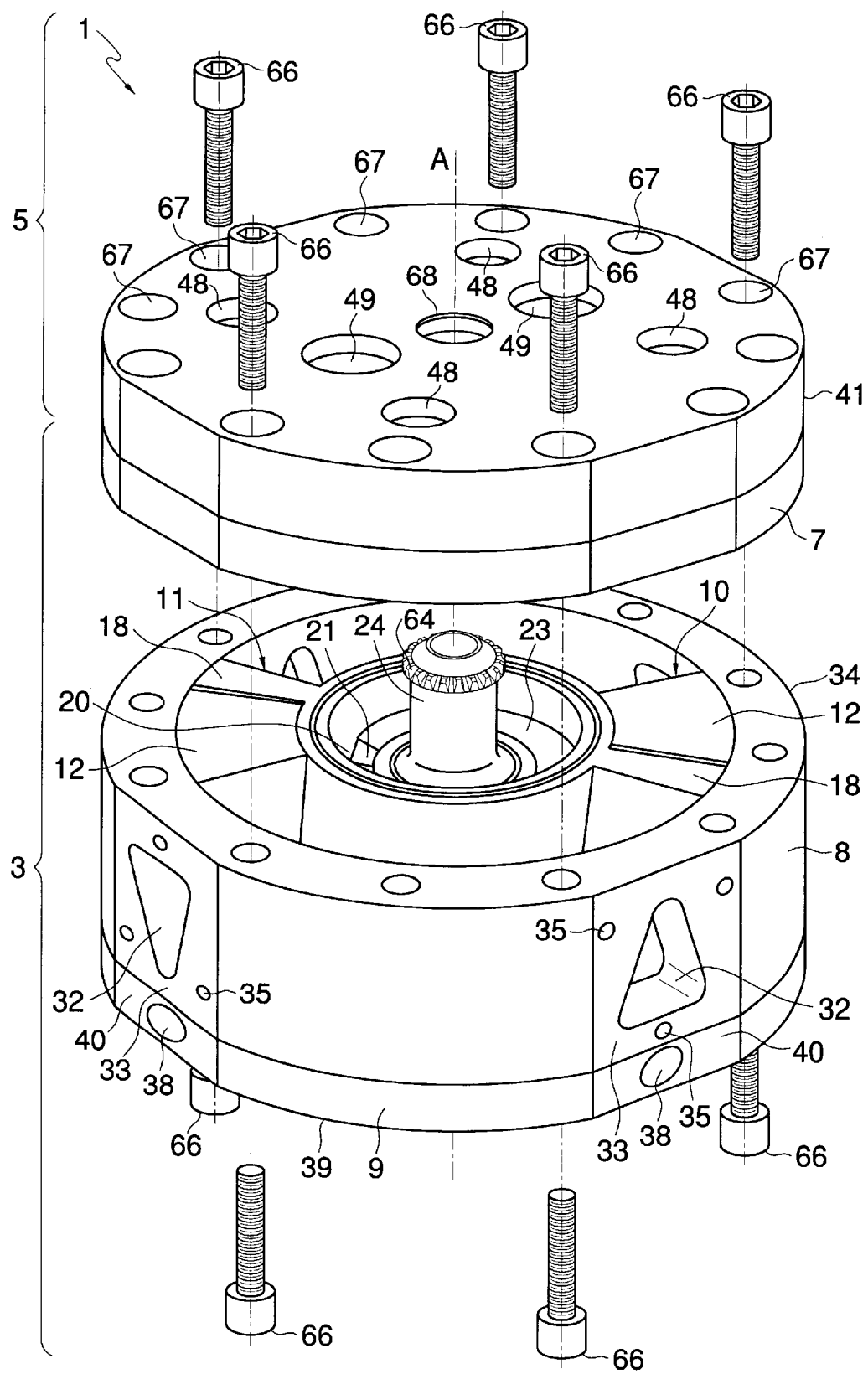
FIG. 1 is a perspective view of a the reciprocating rotating combustion engine of the present invention with the air and fuel intake assembly separated from the combustion and pumping assembly.
Figure 2:
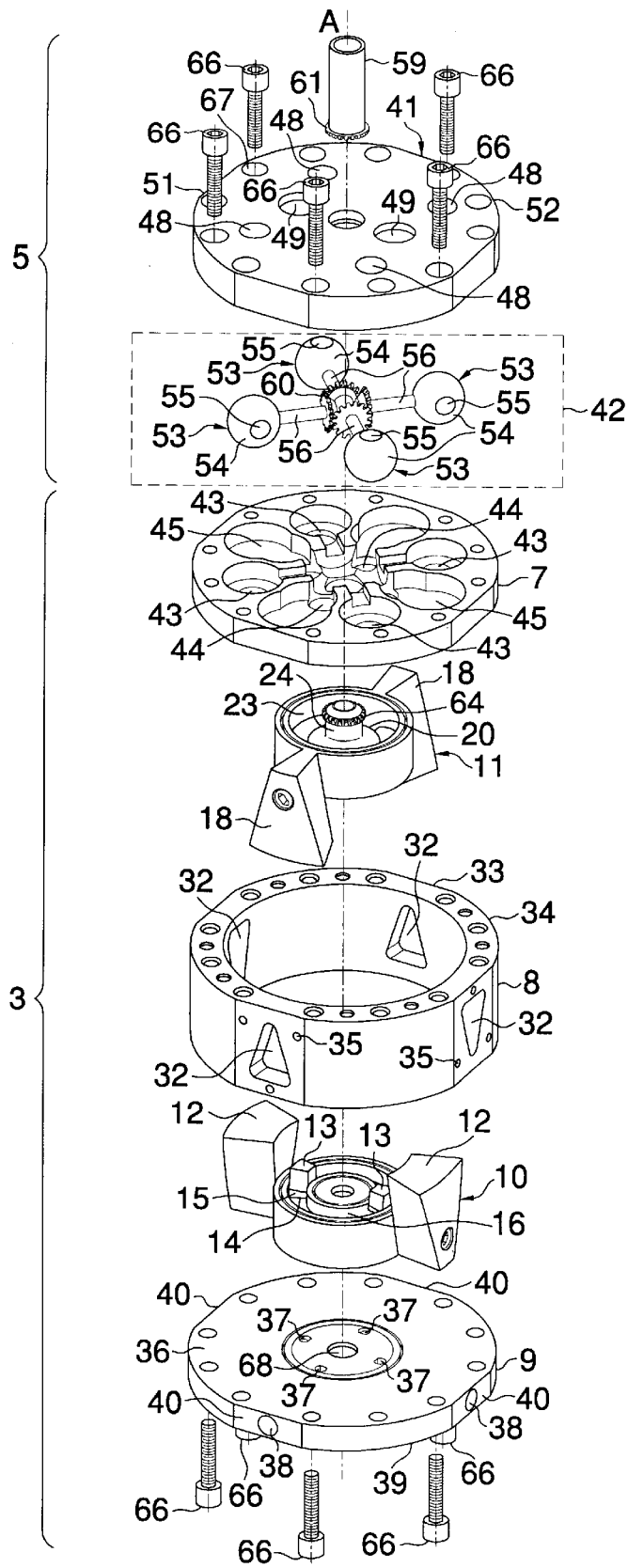
FIG. 2 is an exploded perspective view of the reciprocating rotating combustion engine of FIG. 1.
Figure 3:
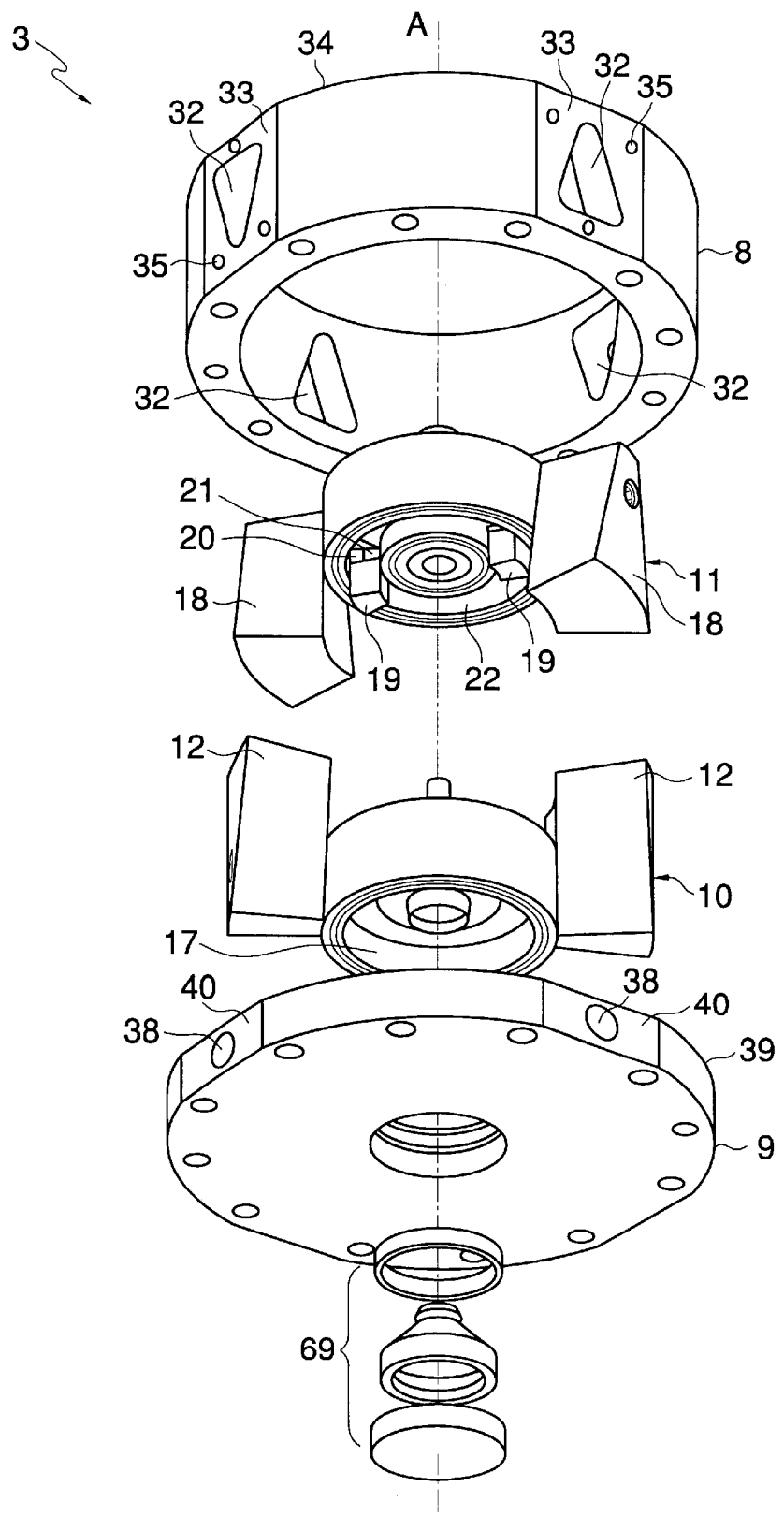
FIG. 3 is an exploded perspective view of the combustion and pumping assembly of FIG. 1.

In the description which follows, any reference to either direction or orientation is intended primarily and solely for purposes of illustration and is not intended in any way as a limitation on the scope of the present invention. Also, the particular embodiments described herein, although being preferred, are not to be considered as limiting of the present invention. Furthermore, like parts or elements in the various drawings hereto are identified by like numerals for ease of reference. Referring initially to FIGS. 1–3, the reciprocating rotating combustion engine 1 includes a combustion and pumping assembly 3 and an air and fuel intake assembly 5. The combustion and pumping assembly 3 includes an intake housing 7, a combustion and pumping housing 8, a lower housing 9, a first reciprocating rotor 10 ("reciprotor") and a second rotor or reciprotor 11. The combustion and pumping housing 8 contains both the combustion chambers and the pumping chambers of the engine. Alternatively, separate combustion and pumping assemblies can be provided each having an independent assembly housing. The housing is preferably cylindrical in shape.

At the core of the engine are the first and second reciprotors 10, 11, so named because each produces a rotating motion about its common central axis A, in equal amounts, approximately 70 degrees, and in opposite directions to create a half cycle. They, then, both reverse direction to move to their original positions to complete the cycle in a reciprocal fashion which includes reciprocative or oscillatory motion. Hence the name, reciprocating motion to describe the entire cycle. Although various combinations and numbers of reciprotors are possible, two reciprotors are preferred and yield an efficient configuration of the engine 1.

It is also possible to have a configuration of the engine 1 with one reciprotor moving and a second one fixed to a stationary housing.

The first reciprotor 10, as shown in FIGS. 2 and 3, includes at least two first free pistons or combustion vanes 12, at least two first pump vanes 13, at least one and preferably two hydraulic outlet or exhaust ports 14 containing exhaust or outlet check valves 15, a lower pumping chamber portion 16, and a hydraulic fluid exhaust or outlet chamber 17. The second reciprotor 11 includes at least two second free pistons or combustion vanes 18, at least two second pump vanes 19, at least one and preferably two hydraulic intake or inlet ports 20 containing intake check valves 21, an upper pumping chamber portion 22, a hydraulic fluid intake or inlet chamber 23, and a synchronization shaft 24. In an alternative embodiment, the synchronization shaft 24 can be attached to either one or both of the reciprotors.

Figure 4:
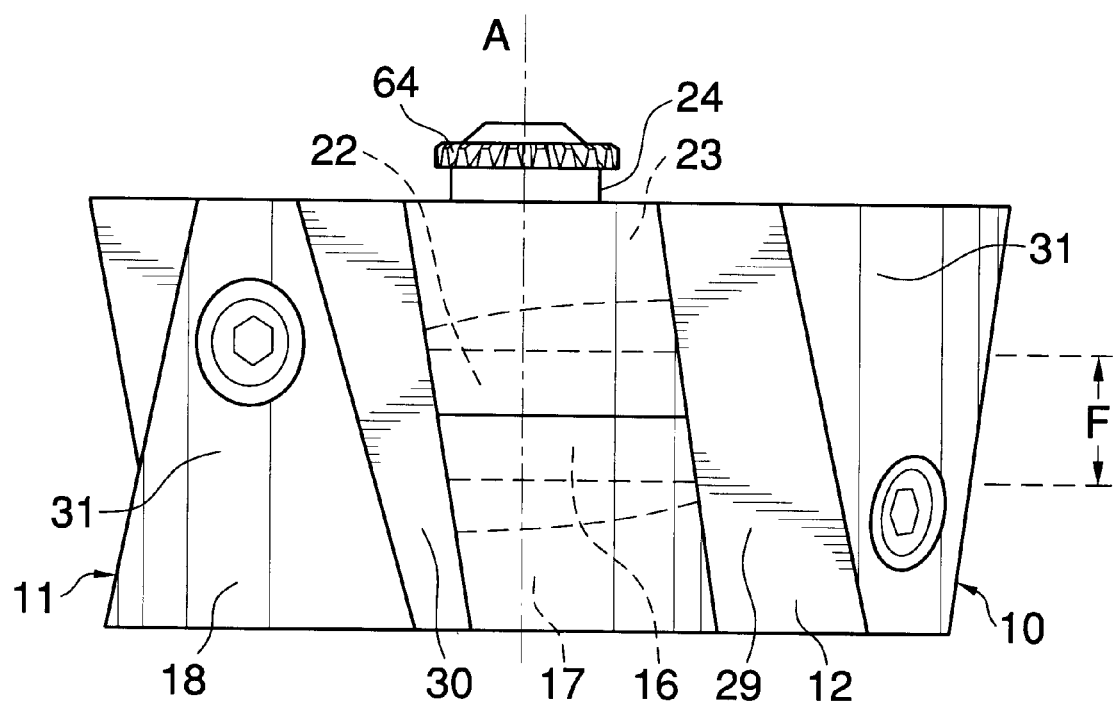
FIG. 4 is an elevational view of the reciprocating rotors or reciprotors of FIG. 3.
Figure 5:
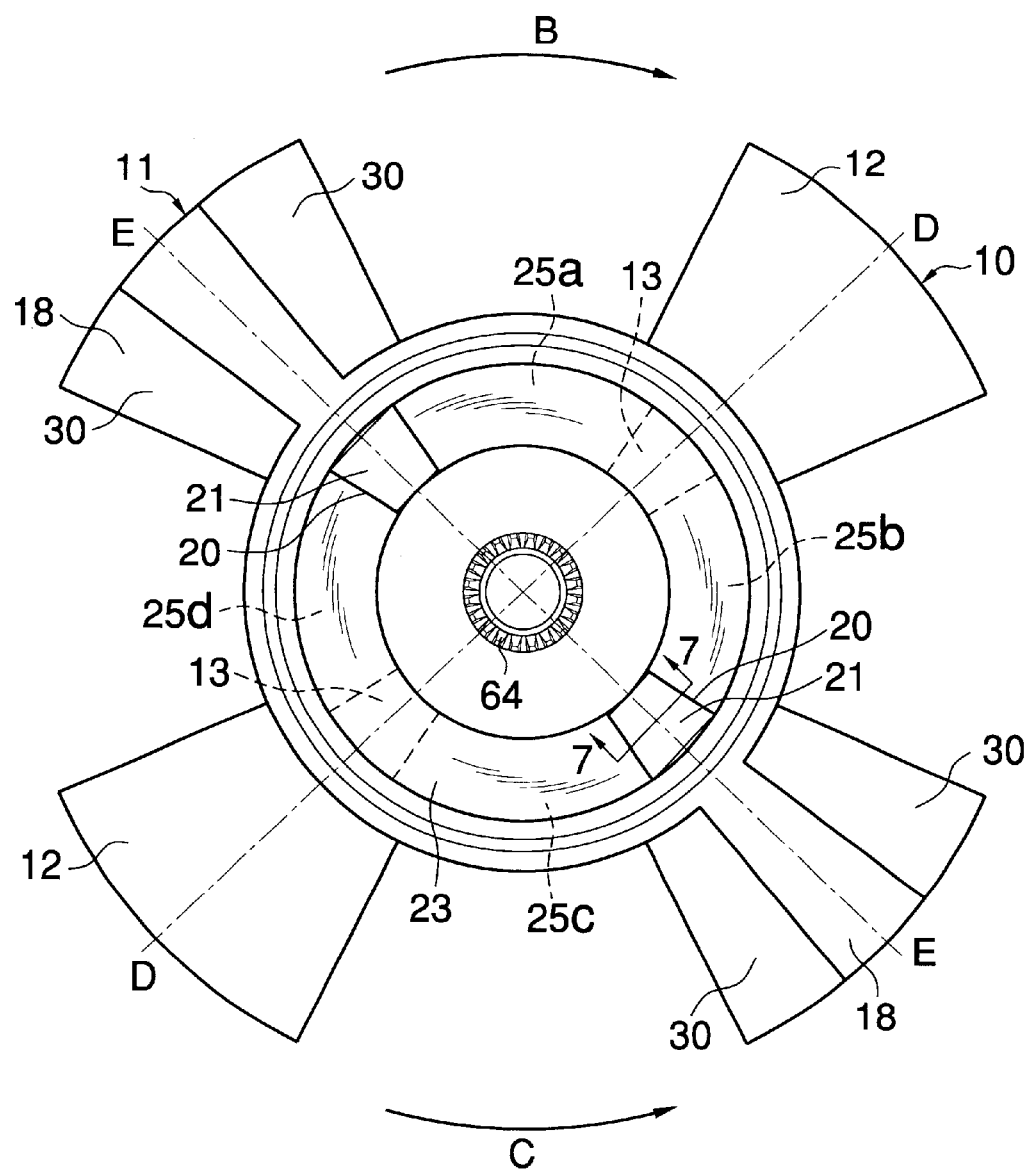
FIG. 5 is a top plan view of the reciprotors of FIG. 3.
Figure 6:
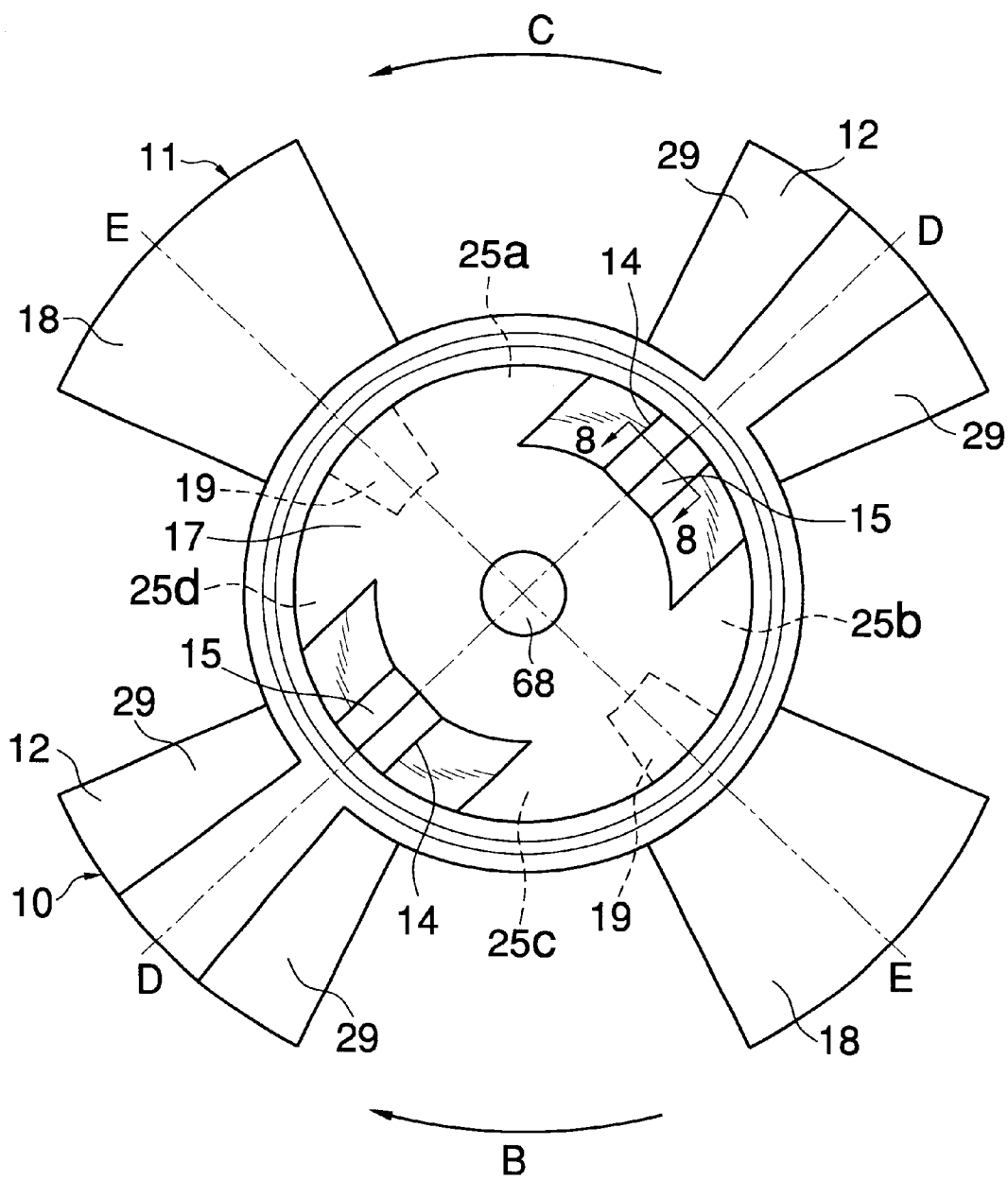
FIG. 6 is a bottom plan view of the reciprotors of FIG. 3.

As shown in FIGS. 4–6, the first and second reciprotors are cooperatively nested together. The lower and upper pumping chambers 16, 22, respectively, fit together to form the hydraulic pump containing the first and second pump vanes 13, 19. Therefore, the pumping vanes divide the hydraulic pump into four chamber portions or areas 25a–25d. The four pumping chambers can vary in size as the first and second pump vanes 13, 19 pivot in opposing pairs about axis A in either a first or clockwise direction as shown by arrow B or a second or counterclockwise direction as shown by arrow C in FIG. 5. Although the pumping vanes can be disposed at any location within the pumping chamber and may be fixed to their respective pumping chamber portions or allowed to move or to rotate slightly within the pump, the vanes are preferably fixed to their respective pumping chamber portions and aligned in their respective pairs. Thus, the first pump vanes 13 are aligned with their centers spaced 180° apart along diameter line D as shown in FIG. 5, and the second pump vanes 19 are aligned with their centers spaced 180° along diameter line E as shown in FIG. 6. The flow path of hydraulic or working fluid through the hydraulic pump is from the hydraulic fluid inlet chamber 23 oriented at the top in FIG. 4, through one of two intake check valves 21 disposed in the hydraulic inlet ports 20, then into the corresponding pump chamber 25a–25d and then through one of two outlet check valves 15 disposed in the hydraulic outlet ports 14 into the hydraulic fluid outlet chamber 17 as shown in FIG. 6.

The inlet and outlet check valves may be any type that permits the flow of fluid in one direction. In one embodiment, one set of check valves upon entry into the pumping chambers and one set of check valves upon exit of the pumping chamber may be sufficient to prevent reversal of flow. The configuration of the check valves will address cavitation and efficiency of flow, i.e., the opening must be as large as is practical and facilitate a flow path to minimize the hindrance of flow around corners or sharp edges to reduce orifice restriction and flow cavitation. Suitable check valves include passive type valves (i.e., reacting to fluid pressure differentials), such as a ball and seat method, a swinging door (flapper) and seat, or a rocking door and seat; however, suitable check valves are not limited to these types of check valves. Preferably the intake check valves can be associated with one of either the first or second pair of pump vanes, and the outlet check valves can be associated likewise with the other pair of pump vanes. Alternatively, since the pump vanes can rotate within the hydraulic pump, passages can be provided in the hydraulic pump among the hydraulic fluid inlet chamber 23, the hydraulic pump chamber portions or areas 25a–25d, and the hydraulic fluid outlet chamber 17. The pump vanes, in reaction to changing pressure differentials would alternately open or cover a passage. Sealing of the check valves to limit or prohibit reversal of the hydraulic fluid flow is pressure enhanced as a matter of course in any check valve design.

Figure 7:
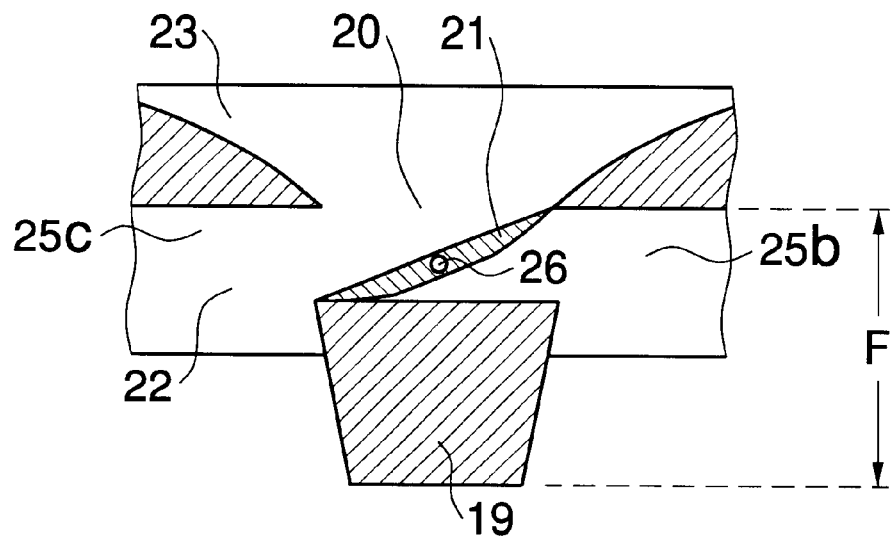
FIG. 7 is a cross-sectional view of the pump chamber inlet check valve.

As shown in FIG. 7, the intake check valve 21 is preferably a rocker type check valve. The intake check valve 21 is preferably disposed at the location of the second pump vane 19. Since the intake check valve 21 can pivot or rock about a pivot point 26, hydraulic fluid can be alternatively directed into either adjacent hydraulic pump chamber 25c, 25b as the first and second pump vane pairs rotate in either the clockwise B or counterclockwise C direction. The hydraulic fluid is prohibited from flowing from the pumping chambers into the hydraulic fluid inlet chamber 23. Thus, each intake check valve 21 is allowed to pivot slightly to create a passage of the hydraulic fluid into the expanding pump chamber while prohibiting passage between the hydraulic inlet chamber 23 and the contracting pump chamber. The pressure of the hydraulic fluid generated by the contracting volume of the contracting pump chamber is utilized to press the rocker valve firmly against its seat, sealing the reversion of flow back into the hydraulic inlet chamber 23.

Figure 8:
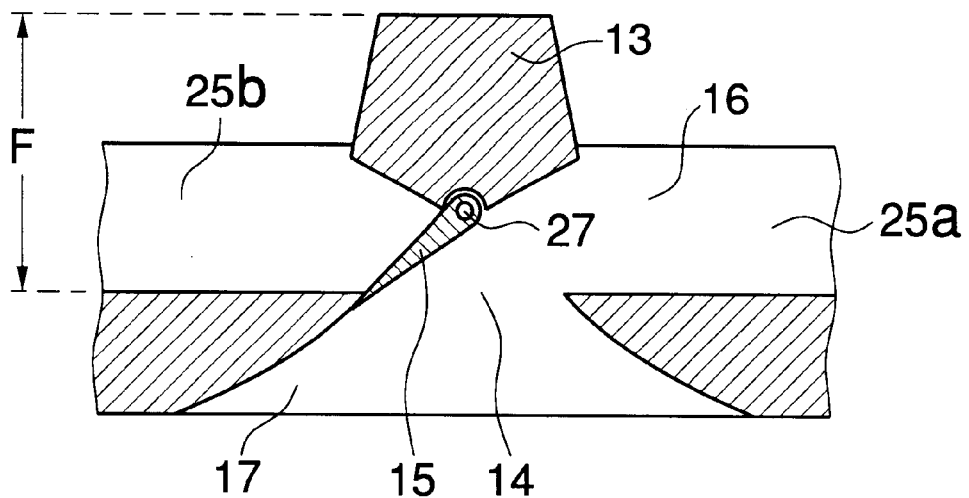
FIG. 8 is a cross-sectional view of the pump chamber outlet check valve.

As shown in FIG. 8, the exhaust check valve 15 is preferably a flapper type check valve. The exhaust check valve 15 is preferably disposed at the location of the first pump vane 13. Since the exhaust check valve 15 can pivot about a pivot point 27, hydraulic fluid can be alternatively directed from either adjacent hydraulic pump chamber 25a, 25b as the first and second pump vane pairs rotate in either the clockwise B or counterclockwise C direction and is prohibited from flowing from the hydraulic fluid outlet chamber 17 into the pumping chambers. Thus, each exhaust check valve 15 is allowed to pivot slightly to create a passage of the hydraulic fluid from the contracting pump chamber while prohibiting passage between the hydraulic fluid outlet chamber 17 and the expanding pump chamber. The pressure of the hydraulic fluid generated by the contracting volume of the contracting pump chamber is utilized to press the rocker valve firmly against its seat, sealing the reversion of flow back into the hydraulic pump chamber.

As shown in FIGS. 4, 7, and 8, the hydraulic pumping chamber has a height F in the preferred cylindrical arrangement. The first pump vane 13 is attached to the lower pumping chamber portion 16 and together with the exhaust check valve 15 extends from this portion a distance F. Similarly, the second pump vane 19 is attached to the upper pumping chamber portion 22 and together with the intake check valve 21 extends therefrom a distance F. Thus, when the upper and lower pumping chambers are nested together, the first and second pump vanes span the entire height F of the hydraulic pump.

The pump is driven by a combustion process, preferably an internal combustion process, more preferably an internal combustion compression ignition process. The first and second pairs of pistons are arranged to translate the combustion energy into reciprocal motion. Preferably, the first and second pistons are arranged to translate the combustion energy into rotating reciprocal motion. The first and second pistons are drivingly connected to the respective first and second pump vanes. Suitable methods for this driving connection include shafts, rack and pinion gearing, and cables. Although it is possible to attach a shaft to a rachet or fly-wheel, the reciprocating rotating combustion engine 1 of the present invention preferably performs no net shaft work.

Figure 9:
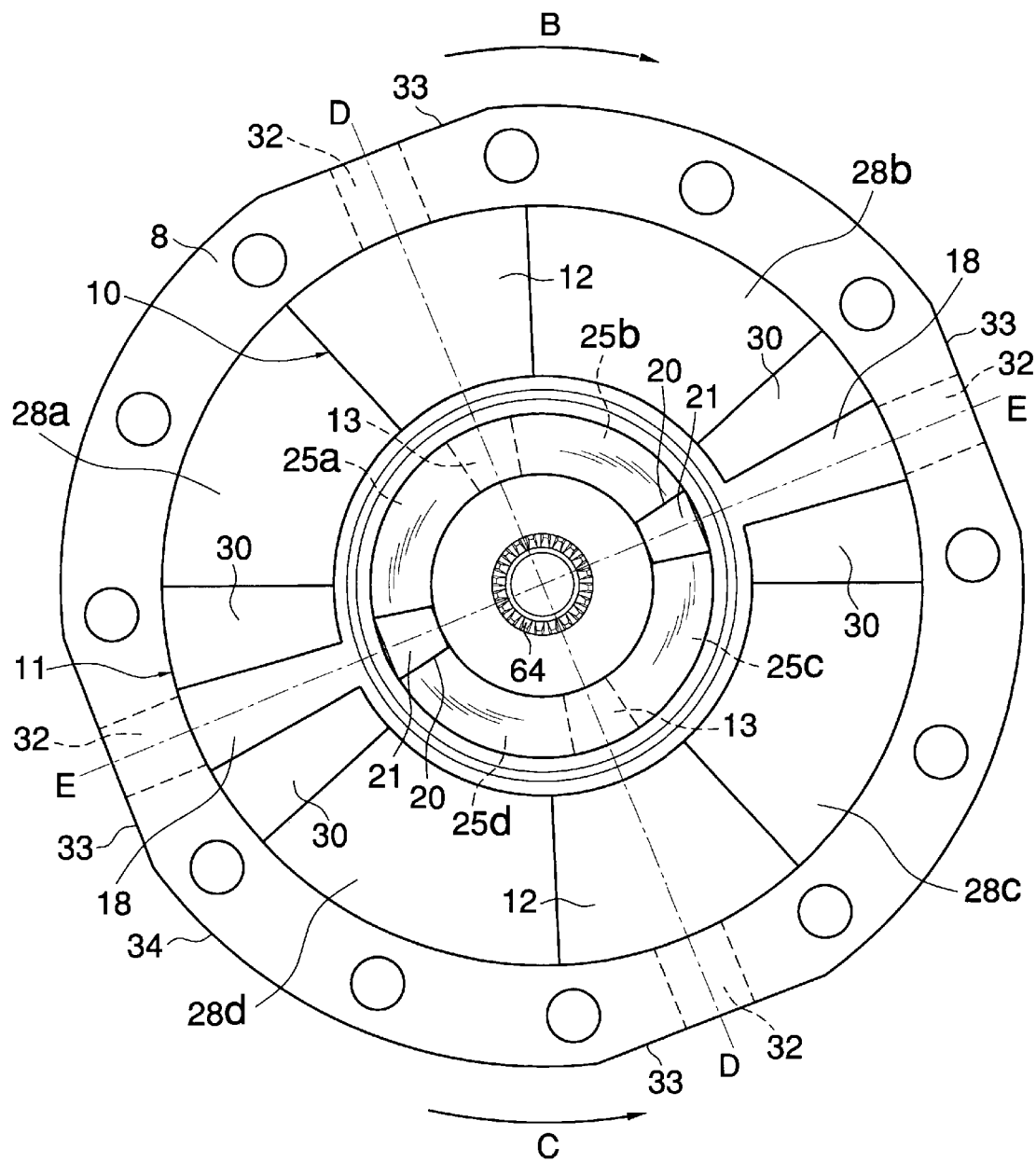
FIG. 9 is a top plan view of the reciprotors in the housing of FIG. 3.

As shown in FIGS. 6 and 9, the first and second pistons 12, 18, respectively, are directly connected to the first and second pump vanes 13, 19. Preferably, the first pistons 12 are connected to the first reciprotor 10 and are aligned with the first pump vanes 13 along line D, and the second pistons 18 are connected to the second reciprotor 11 and are aligned with the second pump vanes 19 along line E. Suitable geometries include linear and spherical arrangements of the pump chambers and combustion chambers. Preferably, the arrangement is cylindrical. More preferably, the pump and combustion chambers are arranged concentrically in a cylinder. The outer part of the cylinder is defined by the outer radius of the combustion and pumping housing 8. The combustion chambers are disposed inside the housing 8 and are further bound on the top by the intake housing 7 and on the bottom by the lower housing 9. The first and second pistons, therefore, define four combustion chamber portions 28a–28d, preferably corresponding to the four pump chamber portions 25a–25d. The pump chambers are disposed within the combustion chambers and are separated therefrom such that liquid or gas generally does not pass therebetween. In this arrangement, the four combustion chambers can vary in size as the first and second pistons pivot in opposing pairs about axis A in either the clockwise B direction or the counterclockwise direction C.

Any one of a number of geometries may be used for the first piston faces 29, shown in FIG. 6, and second piston faces 30, shown in FIG. 9, that bound the combustion chamber portions 28a–28d, also shown in FIG. 9. In one preferred embodiment, the geometry creates as much contact area between the faces as possible. Suitable geometries include flat face to flat face and helical face to helical face. More preferably as shown in FIG. 4, the first and second faces 29, 30 have mating and opposing helical faces, creating outer faces 31 that are generally wedge shaped. Each piston can be an arrangement of different geometries and sizes. Preferably, the first pistons 12 and second pistons 18 are arranged as identical pairs having the same geometry and size. More preferably, all four pistons are identical in geometry and size and are oriented as shown in FIG. 4. The choice of geometry has an effect on the forces applied to the internal parts of the engine 1. For example, properly configured helical faces on the pistons create a thrust load upon combustion that drives the reciprotors together axially along axis A. This counters the axial components of the force generated by the pumping chambers tending to push the reciprotors apart. The countering thrust would allow smaller capacity thrust bearings to be utilized to hold the reciprotors together and facilitate better fluid sealing.

The engine, combustion chambers, and pump chambers can be any size desired or needed to meet the output or work demands of the engine. Preferably, the displacement of the combustion chamber is 2 liters, although other sizes are suitable. Therefore, the dimensions are chosen to yield 2 liters of displacement. Preferably dimensions include a combustion chamber having a total height of 3.1 inches, an outer radius of 4.4 inches and an inner radius of 2.5 inches, a pump chamber having a height of 1.1 inches, an outer pump radius of 2.0 inches and an inner pump radius of 1.3 inches within a combustion and assembly housing having a diameter of 5.6 inches. The pump displacement is preferably selected based upon the operating pressure desired. Suitable operating pressures may be up to about 3000 psi, preferably up to about 4000 psi. The ratio of the size of the combustion chamber to the size of the pump chamber is selected to optimize the performance and efficiency of the engine. Obtainable efficiencies for the engine could be possible up to about 70% as compared to 32% for an ideal Otto cycle engine and 24% for an actual Otto cycle engine.

Figure 10:
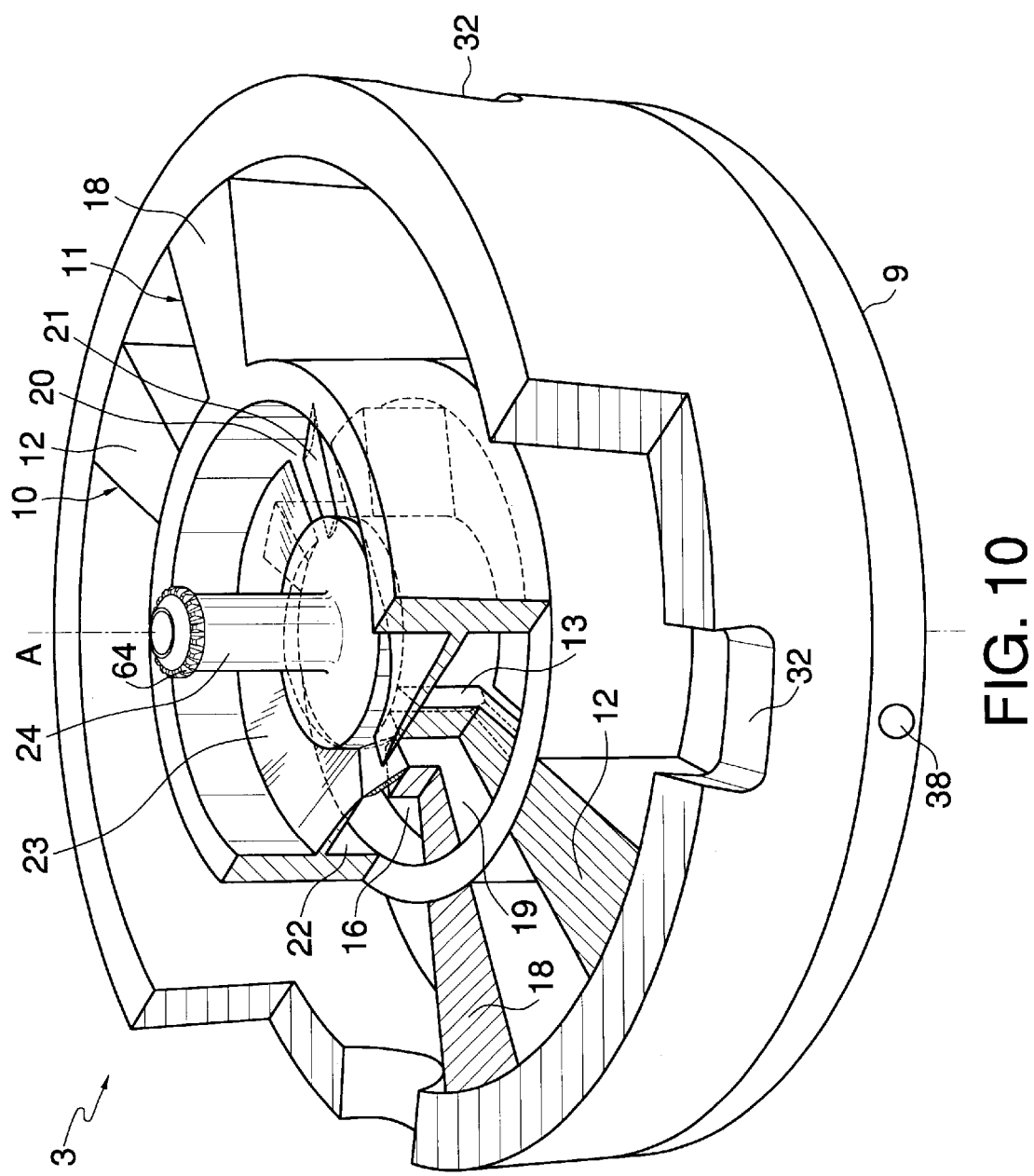
FIG. 10 is a partial perspective cutaway view of an alternative embodiment of the combustion and pumping assembly of FIG. 1.

In FIGS. 4–6, and 9, the reciprotors 10, 11 are shown as being equally spaced within the housing 8. In this mid-cycle position, the lines D and E intersect at 90°. The mid-cycle position seals off the four combustion chamber portions 28a–28d with equal volume. A plurality of exhaust ports 32 passing through the housing 8 are provided to exhaust the spent combustion gases from the combustion chambers. Preferably as shown in FIG. 9, four exhaust ports 32 are provided and are positioned in the housing outboard or aligned with the locations of the first and second pistons in the mid-cycle position. The exhaust ports may contain valves or be passive in nature. Preferably, the exhaust ports are passive in nature. Thus outflow through the exhaust ports 32 is effectively blocked by the first and second pistons when the reciprotors 10, 11 are at the mid-cycle position. As illustrated in FIGS. 1 and 10, as the reciprotors 10, 11 rotate about axis A, the exhaust ports 32 become uncovered permitting exhaust gases to escape.

Any type of cross-section is suitable for the exhaust ports 32, including circular, triangular or rectangular. The exhaust ports 32 are sized to accommodate the exhaust gas flow. The exhaust ports 32 may also be composed of an amalgamation of smaller ports or holes arranged to yield the desired overall cross section. Preferably, the shape and size of the exhaust ports 32 are developed in concert with the shape and size of the first and second pistons to create an optimal sequencing of the exhaust port opening event in the cycle. More preferably, the exhaust ports 32 are generally triangular in cross-section arranged in an alternating pattern as shown in FIG. 2 to correspond to the first and second pistons.

Figure 22:
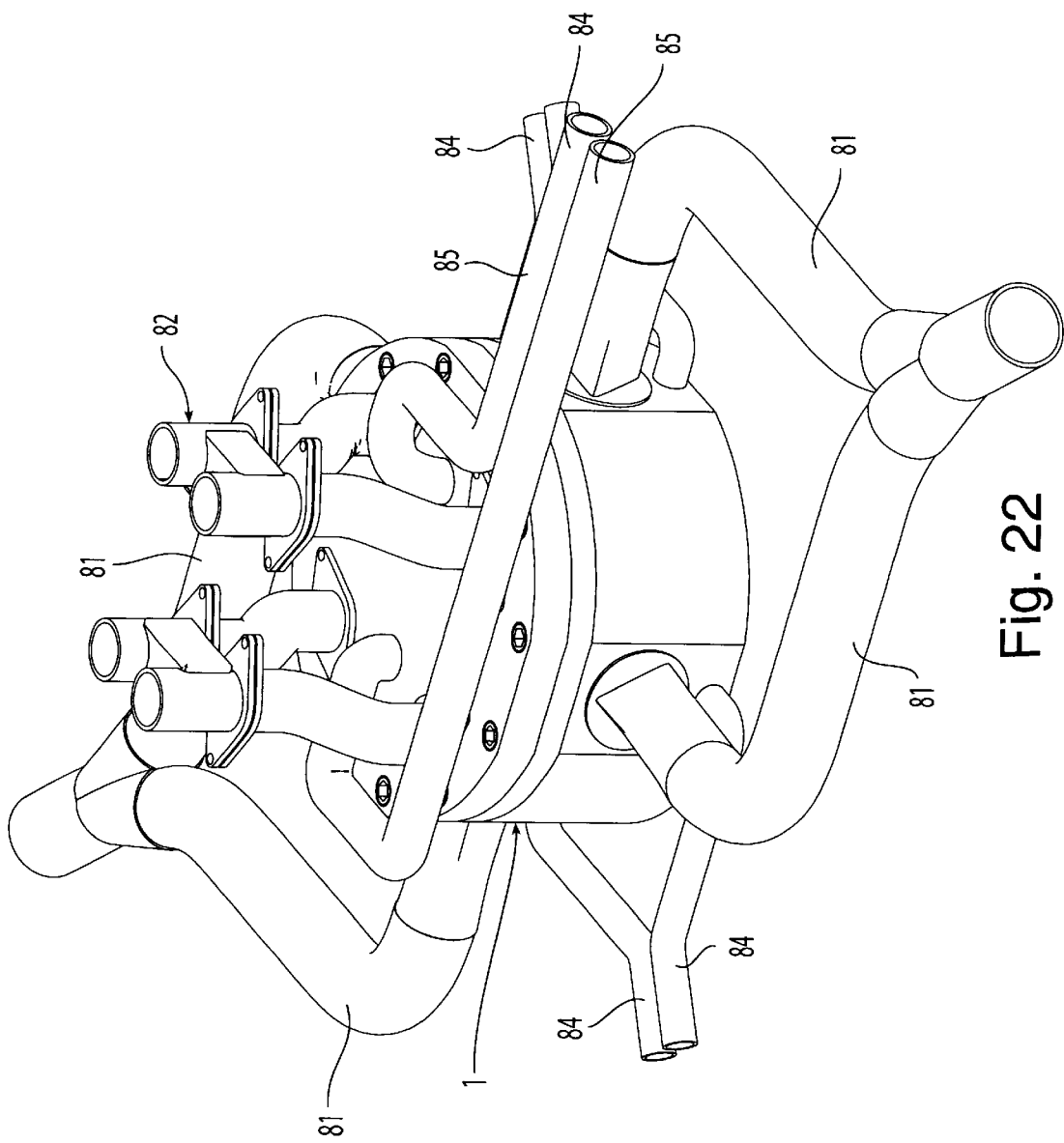
FIG. 22 is a perspective view of the combustion engine of the present invention with attached manifolding and carburetor.

In another embodiment, sequencing of the exhaust ports 32 may involve actively positioning the ports 32 to follow the pistons in their rotational path to delay exhausting of the gases, or to approach the pistons in the opposite direction to expedite the exhausting of gases. Active positioning of the exhaust ports 32 can be accomplished mechanically. In the preferred embodiment, the exhaust ports 32 are passive openings leading to a manifolding of the exhaust port 32 passages through a manifolding such as manifold exhaust pipes 81 as shown in FIG. 22 to direct the exhaust flow to ambient air, a muffling device, a catalytic device to reduce pollutants, or to a turbo charging device. A "tuning" effect is possible by varying the length of the header tubes such that the sequences of the pulses of exhaust gasses to a collecting header takes advantage of "scavenging" back pressure, reducing the effective back pressure seen at the exhaust ports 32. In order to accommodate attachment of such a manifolding system to the housing 8, flat areas 33 are preferably provided on the exterior 34 of the housing and include holes 35 for accepting fasteners to couple the manifold system to the exhaust ports 32..

The lower housing 9 is adapted to provide a smooth or flat bottom for the combustion chamber portions 28a–28d and channeling for the pressurized hydraulic fluid. As is best shown in FIG. 2, a top side 36 of the lower housing 9 includes a plurality of openings 37 for a plurality of tubes (not shown) passing through the lower housing 9 and terminating at a plurality of exits 38. Preferably, the lower housing includes four openings 37 and four exits 38 spaced equally around the lower housing 9. More preferably, the exits 38 correspond in location to the exhaust ports 32 and the outer perimeter 39 of the lower housing 9 includes a corresponding flattened area 40 to facilitate attachment of hydraulic pressure lines.

Figure 11:
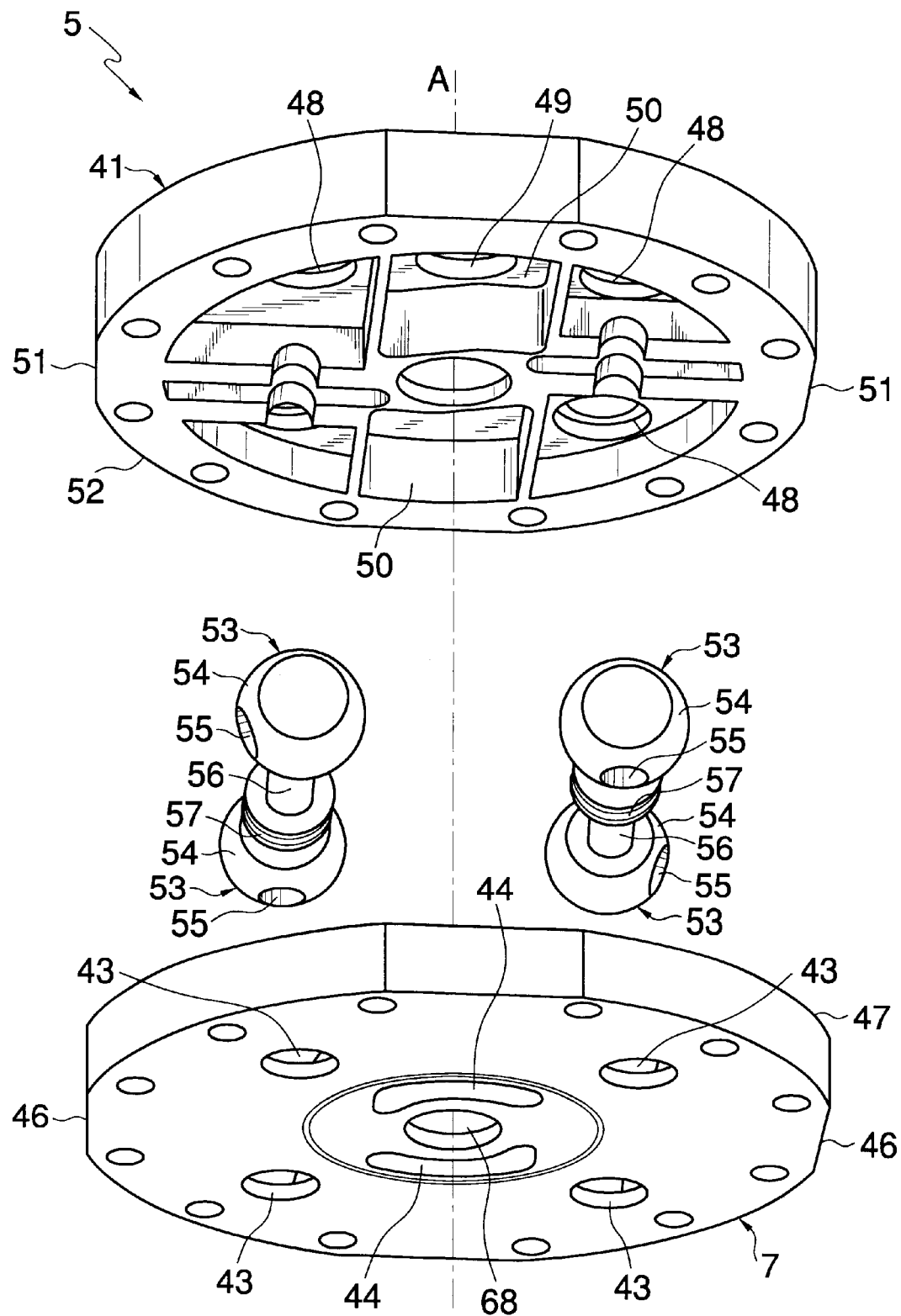
FIG. 11 is an exploded partial perspective view of an alternative embodiment of the air and fuel intake assembly of FIG. 1.
Figure 12:
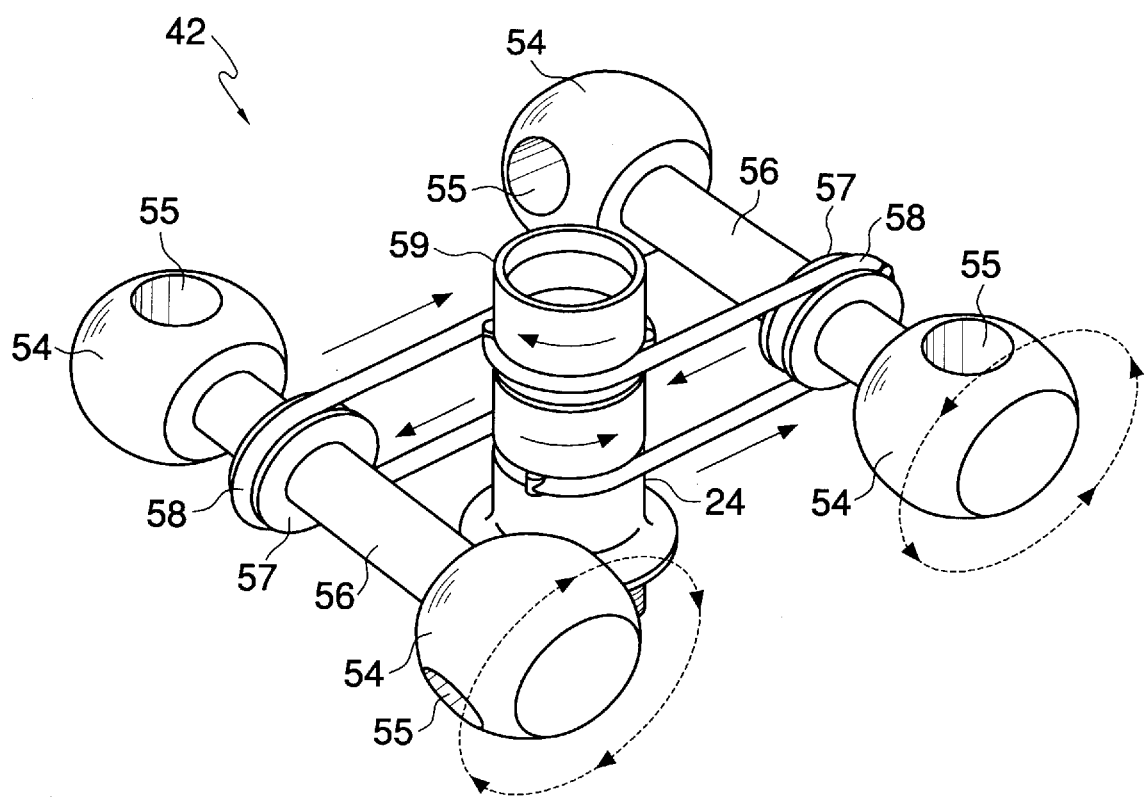
FIG. 12 is a perspective view of one the fuel injection ball valves of FIG. 11 with their diagonally opposite spheres aligned.
Figure 13:
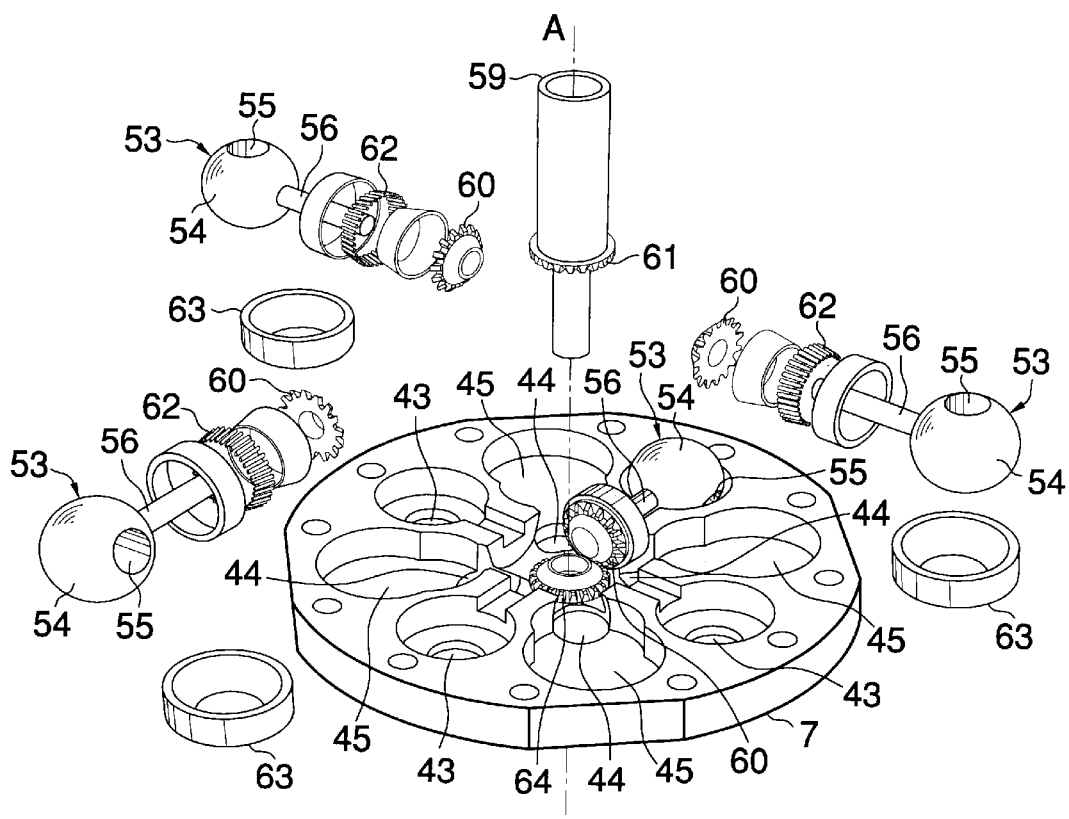
FIG. 13 is an exploded perspective view of another embodiment of the air and fuel intake assembly of FIG. 1.

As is best shown in FIGS. 2 and 11–13, the air and fuel intake assembly 5 includes an upper housing 41, and a fuel intake valve assembly 42. The fuel intake assembly also includes a lower housing. In one preferred embodiment, the lower housing is the intake housing 7; therefore, the intake housing 7 serves as part of the combustion and pumping housing assembly 3 and the air and fuel intake assembly 5. The intake housing includes a plurality of combustion chamber intake ports 43 and a plurality of hydraulic fluid intake or inlet chamber inlets 44. Preferably, the intake housing 7 contains four intake ports 43, one each corresponding to the combustion chamber portions 28a–28d. When assembled, the intake ports 43 are disposed in the top of the combustion chamber, midway between the location of the exhaust ports 32. In one embodiment, the intake housing 7 includes two chamber inlets 44 as shown in FIG. 11. In an alternative embodiment, the intake housing includes four chamber inlets 44 as shown in FIG. 13. The intake housing may further include contours arranged to provide for features including the fuel intake valve assembly 42 or the lower half of small hydraulic fluid wells 45 and flat areas 46 on the exterior perimeter 47 as shown in FIG. 11.

The upper housing 41 includes a plurality of fuel ports 48 and a plurality of hydraulic fluid ports 49 connected to a plurality of hydraulic supply lines 85 as shown in FIG. 22. Preferably, the upper housing 41 includes four fuel ports 48 generally disposed in line with the combustion chamber intake ports 43 and two hydraulic fluid ports 49. As is best shown in FIG. 11, the upper housing 41 also includes contours arranged to provide for feature such as the fuel intake valve assembly 42 or the upper half of small hydraulic fluid wells 50 and flat areas 51 on the exterior perimeter 52.

The fuel intake valve assembly 42 shown in FIGS. 2 and 11–13 is disposed between the upper housing 41 and the intake housing 7. The fuel intake valve assembly 42 includes a plurality of fuel intake valves 53. Preferably, the fuel intake valve assembly 42 includes four fuel intake valves 53. The configuration of the fuel intake valves 53 is not critical to the function or operation of the reciprocating rotating engine 1 cycle. Suitable fuel intake valves include poppet, sliding gate, rotary, or any other design that will alternately fill and effectively seal the combustion chamber portions 28a–28d in the correct sequence. Similarly, the fuel intake valves 53 may be actuated by any method that creates the correct sequencing of intake delivery of air-fuel mixture. Suitable methods include gears, cams, belts, cables, hydraulics, and any other means of positive actuation.

In one embodiment, each fuel intake valve 53 is arranged as a sphere 54 having a passage 55 running through the diameter of the sphere 54 and connected to a drive shaft 56. As arranged in the fuel intake valve assembly 42, the passages 55 in the spheres can be aligned with the fuel ports 48 in the upper housing 41 and combustion chamber intake ports 43 to permit an air and fuel mixture to pass from an injection system or carburetor system 82 as shown in FIG. 22 into the combustion chambers 28a–28d. Alternatively the passages 55 are not so aligned, effectively sealing-off the associated combustion chambers. By rotating the drive shaft 56 and hence the sphere 54, each passage 55 can be sequenced between alignment and non-alignment. In one preferred embodiment, the passages 55 will be sequenced so as to be in alignment for combustion chambers that are disposed 180° apart, for example 28a and 28c or 28b and 28d. For example in FIG. 12, the leftmost and rightmost spheres 54 have their respective passages 55 aligned vertically so as to be aligned with their corresponding fuel ports 48, intake ports 43, and combustion chambers. The remaining diagonally opposed spheres 54 are disposed so that their respective passages 55 are not aligned with their respective fuel ports 48, intake ports 43 and combustion chambers.

In one embodiment as shown in FIGS. 11 and 12, the fuel intake valve assembly 42 includes two drive shafts 56 each connected to two spheres 54. The drive shafts 56 are arranged parallel to each other. The drive shafts include a collar 57 for engaging a cable 58 that is attached to and driven by a sequencing shaft 59 for sequencing the passages 55. In one preferred embodiment, the passages 55 in the diagonally opposed spheres 53 are rotated about their common drive shafts by an angle up to about 90°. In another preferred embodiment, the passages 55 in the diagonally opposed spheres 53 are rotated about their common drive shafts through an angle corresponding to the angle of reciprocal rotation of the pistons and pump vanes. In yet another preferred embodiment, the passages 55 in the diagonally opposed spheres 53 are rotated about their common drive shafts by an angle up to about 70°.

In another embodiment as shown in FIGS. 2 and 13, the fuel valve intake assembly 42 includes four drive shafts 56 each connected at one end to one sphere 54. The drive shafts 56 are arranged radially out from the central axis A. The other end of each drive shaft 56 immediately adjacent the central axis A includes a drive shaft bevel gear 60. The drive shaft bevel gears 60 engage and are driven by the sequencing shaft bevel gear 61. In this embodiment, each drive shaft 56 and sphere 54 assembly also includes bearings 62 and a shape conforming sphere seat 63 to assist in the rotation and sealing of the valves.

The first and second pistons 12, 18 are positioned so that the passages 55 will be aligned to permit proper gas and fuel flow into the chambers. Therefore, the sequencing of the first and second pistons 12, 18 and the passages 55 will be synchronized. In order to accomplish this, the synchronization shaft 24 as shown in FIG. 2 extends through the intake housing 7 adjacent the axis A ends of the drive shafts 56. The synchronization shaft bevel gear 64 is provided at this location to engage the bevel gears 60 on the drive shafts 56. This arrangement also synchronizes the motion of the first reciprotor 10 to the second reciprotor 11. In another embodiment, the limits of travel or rotation of the first or second reciprotor can be defined by the synchronization shaft 24. In another embodiment, the as best shown in FIG. 2, the sequencing shaft 59 may extend through the upper housing 41 to engage, for example, a starter motor.

Any conventional method of holding and securing together the various parts of the engine 1 may be used. Suitable methods include mechanical fasteners such as clamps, bolts, screws, welds, clamps, pins, and rivets. Alternatively, suitable adhesives may be employed. Preferably as shown in FIGS. 1 and 2, the engine 1 is held together by a plurality of threaded bolts 66 inserted into and engaging a corresponding plurality of threaded bolt holes 67. In an alternative embodiment, the sequencing shaft 59 can pass through a central shaft hole 68 running along axis A in the engine 1, past the combustion and pump chambers, and engage an anchor or thrust bearing assembly 69 which is shown in FIG. 3. The sequencing shaft 59 may be threaded directly into the anchor assembly 69 or may be attached thereto by mechanical fasteners such as bolts. The anchor assembly is arranged to permit the sequencing shaft 59 to rotate while anchoring the shaft 59 into the engine 1.

The separations among the moving parts along the rotation axis A can be controlled by lubricated thrust bearings (not shown). For example, the upper and lower pumping chamber portions 22, 16 will have a varying net force driving them apart. This net force is directly proportional to the operating pressure of the working hydraulic fluid acting on the constantly changing projected or effective area (i.e., along the common rotation axis) of the contracting pumping chambers. The lower pumping chamber portion 16, therefore, will be continuously thrust away from with a force proportional to the operating pressure of the working hydraulic fluid acting against the projected area of the bottom of the pumping chamber. The thrust bearings will rotate proportionally to the motion of the reciprotors. Although the thrust bearings are not net rotating but are oscillating (reciprocating), this proportional rotation should be sufficient to completely rotate most of the rollers in their roller bearing races, providing the continuous duty cycle requirement for the thrust bearings.

Various seals can be used throughout the engine as required for performance. For example, different mating surfaces can have suitable seals disposed therebetween. Suitable materials include standard gasketing and sealing materials used with combustion engines and hydraulic pumps. For example, a seal can be provided between the intake housing 7 and the hydraulic fluid inlet chamber 23. This seal resists varying combustion chamber pressures from the outside and inner ambient hydraulic fluid pressures from the inside. Preferably, the seal would be a continuous ring disposed in grooves in the faying surface of the intake housing 7 and the faying surface of the hydraulic fluid inlet chamber 23.

A seal can be provided between the upper and lower pumping chamber portions 22, 16. This seal resists variable combustion chamber pressures from the outside and variable hydraulic fluid pressure forces up to the maximum fluid working pressure from the inside. Preferably, the seal would be a continuous ring inhabiting grooves in the faying surface of the upper pumping chamber portion 22 and the lower pumping chamber portion 16.

A seal can be provided between the hydraulic fluid outlet chamber 17 and the lower housing 9. This seal resists varying combustion chamber pressures from the outside and a steady maximum working hydraulic fluid pressure from the inside. Preferably, the seal would be a continuous ring inhabiting grooves in the faying surfaces of the hydraulic fluid outlet chamber 17 and the lower housing 9.

Combustion chamber seals can also be provided. These seals contribute as much to the efficiency of the engine as to its operation. These seals are optional. The engine 1 can be made without seals. In the case where combustion chamber seals are used, suitable seals include seals capable of ensuring that there is sufficient build-up of combustion pressure such as integrated seals similar to conventional Wankel rotary engine apex and side seals in common use today. As the engine 1 approaches internal steady state temperatures, a minimal clearance will exist between the first and second pistons 12, 18 and the combustion and pumping housing 8. This small clearance can be sufficient to adequately seal the combustion gasses for maximum efficiency. The concern for "blow-by" gasses is small because the gasses will transfer to the adjacent combustion chamber and not be lost from the combustion process to the outside of the system. In fact, there may be a net cooling effect gained in allowing a small "leak" to transfer between adjacent combustion chambers.

In an alternative embodiment, an adequate seal can be provided between the first and second pistons 12, 18 and the combustion and pumping housing 8 by fabricating labyrinth type grooves in the opposing faces. The labyrinth groove would create sufficient surface turbulence of the blow-by gasses that would restrict the flow of the gasses to an acceptable level of blow-by. The clearances of adjacent sealing surfaces is very well controlled by axial thrust loads and bearings holding parts in sufficient concentricity.

Referring now to FIGS. 14–21, the combustion and pumping process of the reciprocating rotating engine 1 according to the present invention will be described. The process is shown schematically starting with a cycle in progress.

Figure 14:
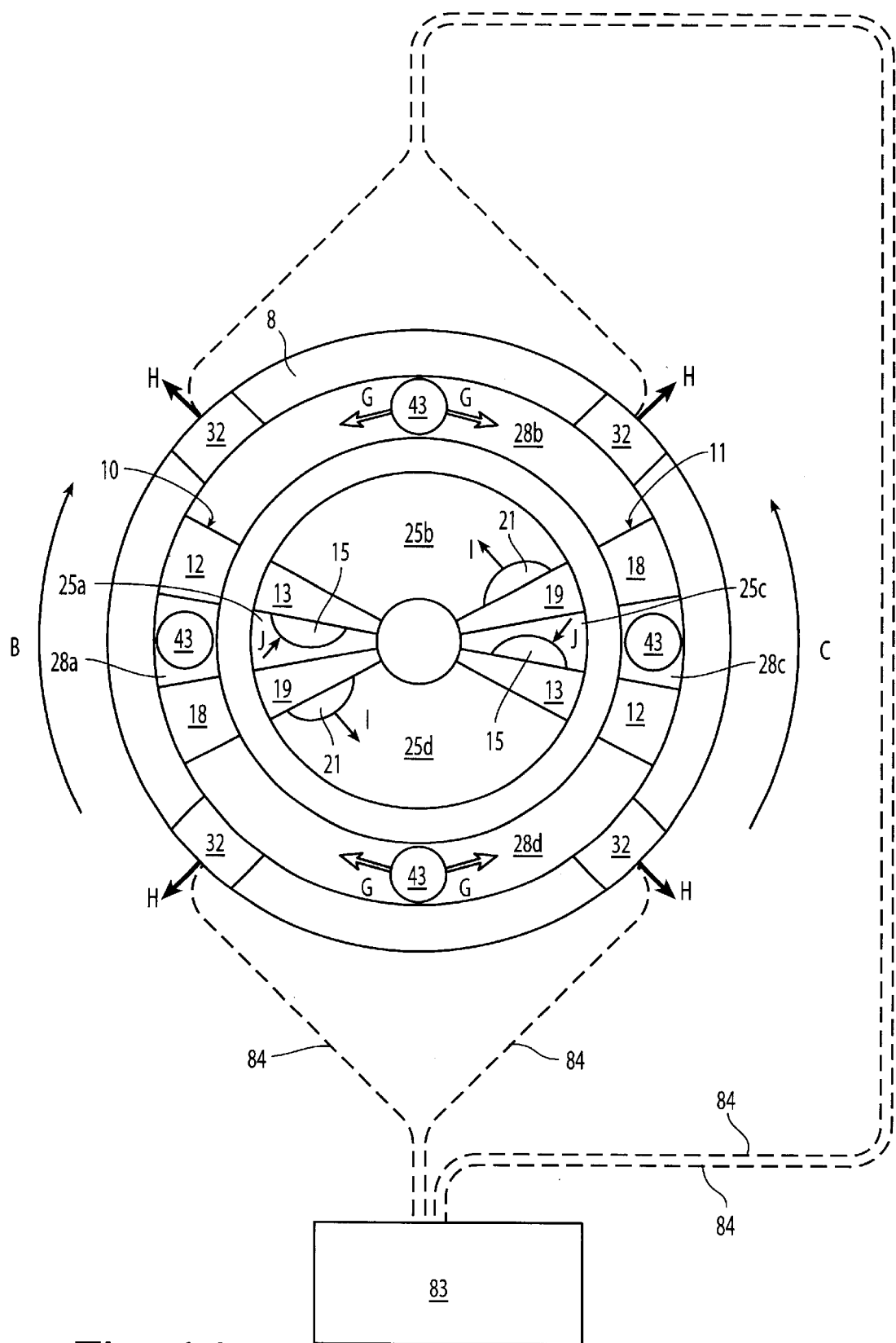
FIG. 14 is a schematic representation of a combustion and pumping cycle-in-progress of the engine of the present invention and a hydraulic accumulator.

Beginning with FIG. 14, from this cycle-in-progress position, the first pistons 12 are moving counterclockwise C, and the second pistons 18 are moving clockwise B. In other words, the motion of the pistons is opposing. As the second pistons 18 move clockwise B, one face of each second piston 18 approaches a corresponding face of each first piston 12, reducing the volume contained in combustion chamber portions 28a and 28c generally the same amount. At the same time, the other face of each second piston 18 recedes away from the corresponding other face of each first piston 12, increasing the volume contained in combustion chamber portions 28b and 28d identically.

The two intake ports 43 positioned midway above the compressing combustion chamber portions 28a and 28c are closed, and the two intake ports 43 positioned midway above the expanding combustion chamber portions 28b and 28d are open. An air and fuel mixture enters combustion chamber portions 28b and 28d through the corresponding intake ports 43 as indicated by arrows G. The volume of combustion chamber portions 28a and 28c is decreasing, and the pressure of the air and fuel mixture contained therein is increasing. Exhaust gases from the previous combustion cycle are exiting through all four exhaust ports 32 as indicated by arrows H. Preferably, the combusted and expended exhaust gasses flow out through the exhaust ports 32 and into exhaust manifolding from all four exhaust ports simultaneously.

With respect to the pumping chambers, the first pump vanes 13 are moving counterclockwise with the first pistons 12, and the second pump vanes 19 are moving clockwise with the second pistons 18. Thus, pump chamber portions 25a and 25c are being pressurized and compressed, while pump chamber portions 25b and 25d are being expanded. This motion and associated expansion and compression of the pumping chambers moves hydraulic fluid through the pump and pressurizes it. The hydraulic fluid is fed, by gravity for instance and also possibly suction, into the hydraulic fluid inlet chamber 23 as shown in FIGS. 4, 7 and 10. The intake check valves 21 are positioned to allow the hydraulic fluid to be drawn into pump chamber portions 25b and 25d as indicated by arrows I and to prevent passage of pressurized hydraulic fluid from pump chamber portions 25a and 25c back into the hydraulic fluid inlet chamber 23. The outlet check valves 15 are positioned to direct pressurized hydraulic fluid from pump chamber portions 25a and 25c into the hydraulic fluid outlet chamber 17 as shown by arrows J.

Figure 15:
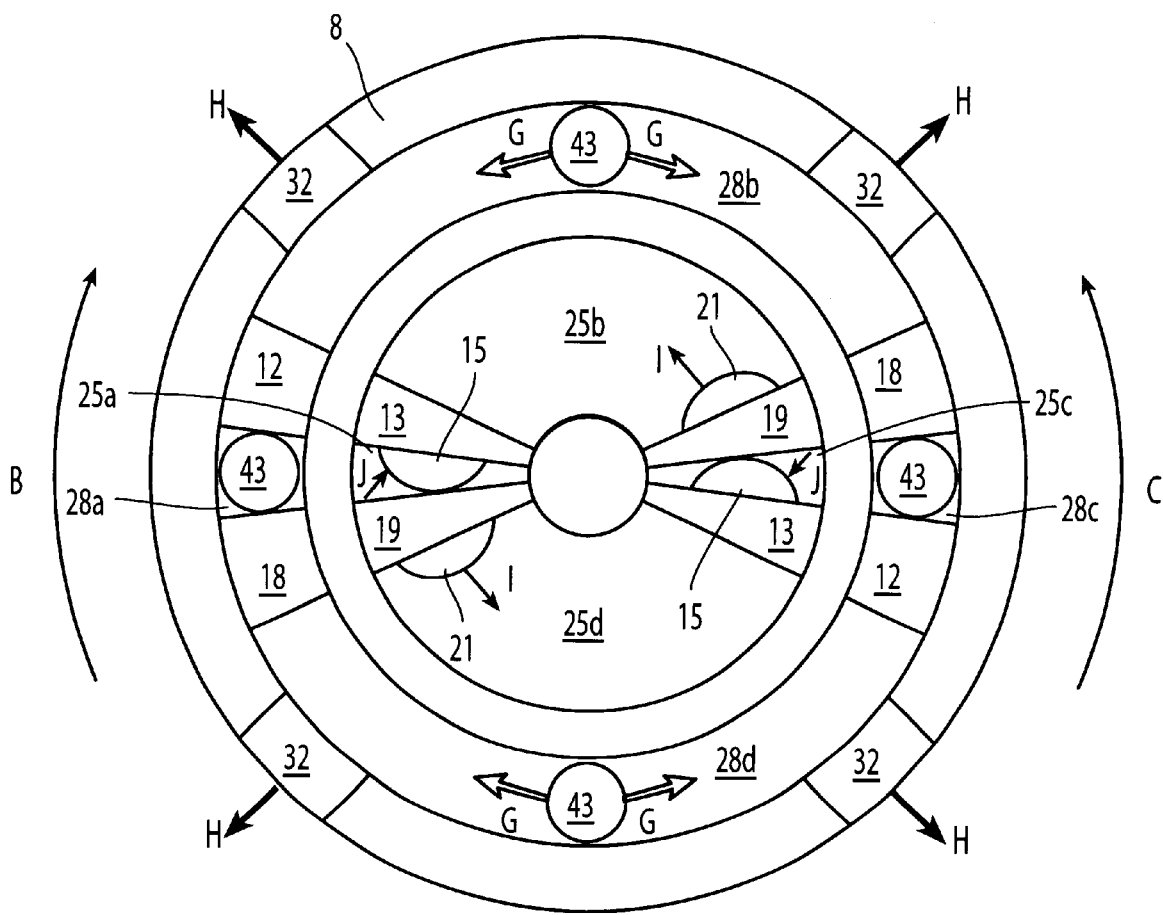
FIG. 15 is a later schematic representation of the engine of FIG. 14.

Referring next to FIG. 15, the motion of the pistons and pump vanes continues as in FIG. 14 with the associated in-flow of the air and fuel mixture G and the intake, pressurization and exhaust of hydraulic fluid J. The air and fuel mixture already in the combustion chamber portions 28a and 28c will continue to compress, creating an increase in pressure and temperature in the combustion chamber portions 28a and 28c. The advancing of the pistons 12, 18 toward each other will decrease in rate due to the increasing pressure. Once sufficient compression occurs, the air and fuel mixture will compression ignite. The separation of the pistons at the point of compression ignition is variable, with major influencing factors being, for example, the temperature of the engine components, cycle rate, speed at which the pistons are advancing toward each other, fuel type, mixture ratio, and compression sealing effectiveness.

The opposing faces of pistons 12, 18 would contact if their respective motions advancing toward each other were unabated. The faces of the pistons that are approaching each other, however, are shaped such that they will preferably contact a maximum area of each others faces if contact were to occur. This geometry requires the contained volume in these two combustion chambers to approach a zero volume. The nature of gas behavior in a trapped container will cause the gas to increase in pressure and temperature as the volume decreases. As the volume approaches zero, the pressure is believed to will rise exponentially provided that the seals are reasonably effective. The temperature increase is the impetus for the compression ignition. Although the temperature rise associated with compression is the impetus for ignition, glow plugs or spark plugs (not shown) can optionally be used to ignite the compressed mixture. A spark or multiple sparks may be provided to create a more efficient or completely burned mixture in the cycle. Spark ignition or glow plug ignition may be required to start a cold engine or to sustain the cycle in colder climates. Turbo charging or supercharging the intake charge may be used to increase the efficiency or enhance the completeness of combustion. Further, both combustion chambers do not necessarily have to ignite simultaneously.

Figure 16:
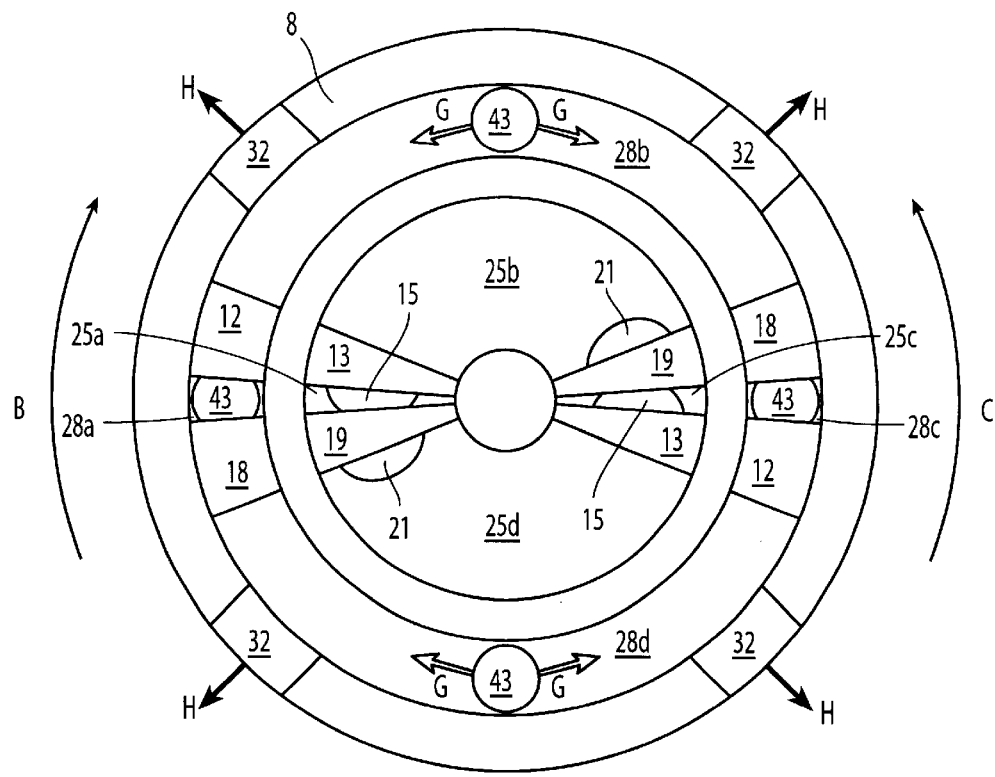
FIG. 16 is a later schematic representation of the engine of FIG. 15.

As is shown in FIG. 16, the advancing of the pistons 12, 18 toward each other will continue to decrease in rate, this time due to the increasing pressures from combustion of the fuel/air mixture. The pistons 12, 18, and hence the pump vanes 13, 19, eventually stop, at least momentarily, and then reverse their rotational direction. At this point of stopping and reversing direction, the first and second pistons have reached the maximum point of rotation in their respective directions for a given fuel and air and fuel mixture. The first and second pistons will then begin to reverse direction under the expanding ignition gases within combustion chamber portions 28a and 28c. At this point, the pressure in the pump chambers will equalize, and the check valves 15, 21 will begin to close and open on the other side of the pump vanes in response to these changes in pressure in the pump chambers.

At this point, the intake ports 43 are disposed midway in combustion chamber portions 28b and 28d which are at their maximum opening, allowing a fresh delivery of air-fuel mixture delivered during the out-flow of exhaust gases. The partial vacuum created at the center of the outflow by the exhaust flow out the exhaust ports 32 at both ends of each of exhausting combustion chamber portions 28b and 28d contributes to this in-flow. The fresh intake charge will attempt to follow the flow of the exhaust out the exhaust ports 32. In order to account for the flow of fresh intake out of the exhaust ports, the shape of the exhaust ports 32 can be configured to prevent any unburned air-fuel mixture that is entering the combustion chamber from progressing to the exhaust ports 32 before the pistons return to cover the exhaust ports 32.

As the combusted gases in combustion chamber portions 28a and 28c expand, they perform work on the piston 12, 18 faces, changing the direction of rotation and forcing them apart. The work that is performed pressurizes the working fluid in the pumps, completes the exhausting of the spent gases in the adjacent combustion chambers, and imparts momentum to the pistons to complete the cycle. The two compression ignited combustion chamber portions 28a and 28c are now increasing in volume and the remaining two adjacent combustion chamber portions 28b and 28d are correspondingly decreasing in volume. The exhaust that has been flowing through the four exhaust ports is now being forced out of the two chambers due to the decreasing volume. The intake ports 43 in combustion chamber portions 28b and 28d are closing to avoid undesirable reversal of intake flow due to decreasing volume and increasing pressure.

Figure 17:
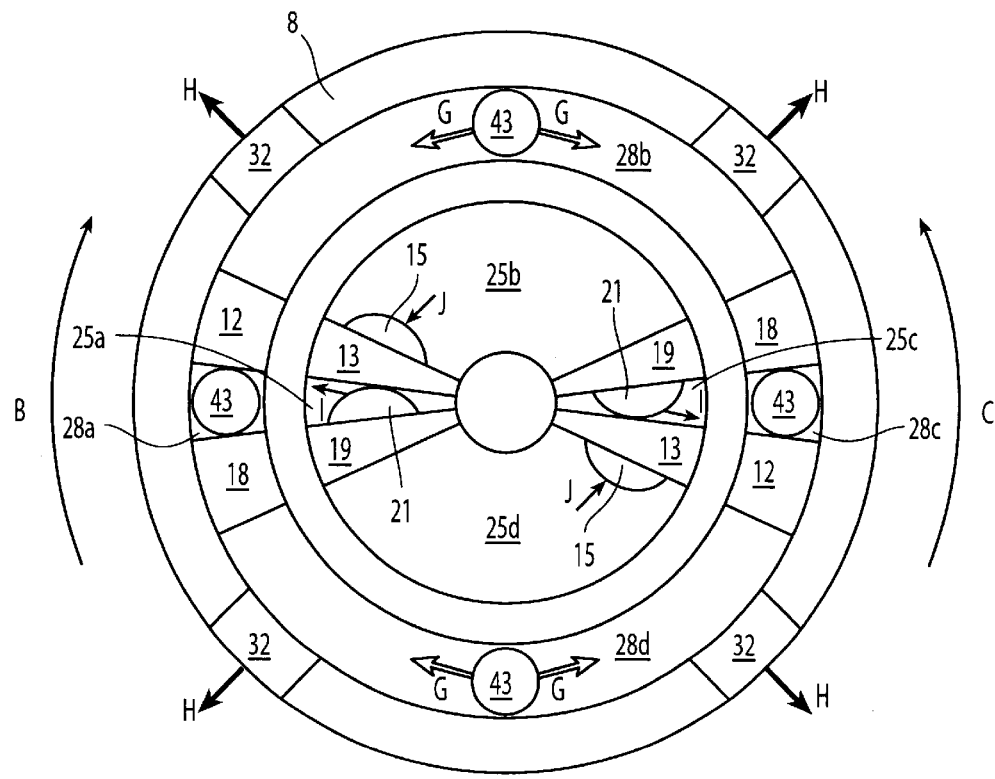
FIG. 17 is a later schematic representation of the engine of FIG. 16.
Figure 18:
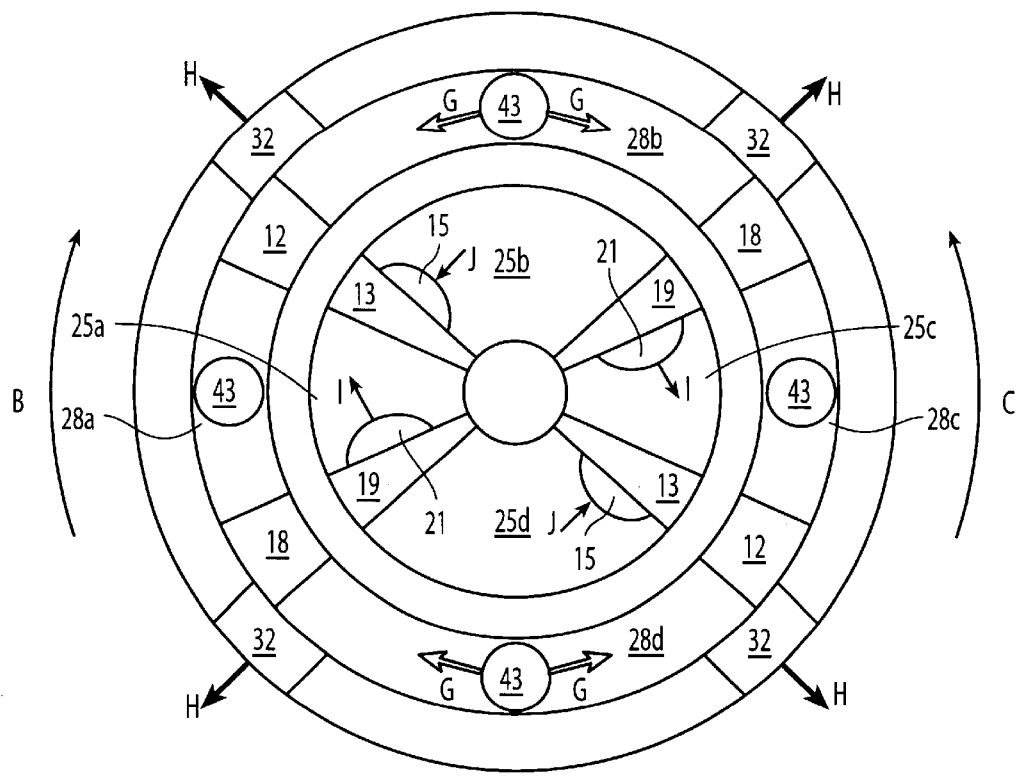
FIG. 18 is a later schematic representation of the engine of FIG. 17.

In FIG. 17, the first pistons 12 and first pump vanes 13 are now rotating clockwise B, and the second pistons 18 and second pump vanes 19 are rotating counterclockwise C. The intake check valves 21 have switched to permit hydraulic fluid to enter expanding pump chamber portions 25a and 25c from the hydraulic fluid inlet chamber 23 as indicated by arrow I. Similarly, outlet check valves 15 have switched to permit passage of pressurized hydraulic fluid from compressing pump chamber portions 25b and 25d into the hydraulic fluid outlet chamber 17 as indicated by arrow J. This rotation of the pistons and pump vanes continues, and the pistons accelerate and begin to overlap the exhaust ports 32 as shown in FIG. 18. The intake ports 43 in combustion chamber 28a and 28c are opening, permitting the inflow of air an fuel as indicated by arrow G, and the intake ports 43 in combustion chamber portions 28b and 28d are nearly closed. The pumping of hydraulic fluid in the pump chambers continues as before.

Figure 19:
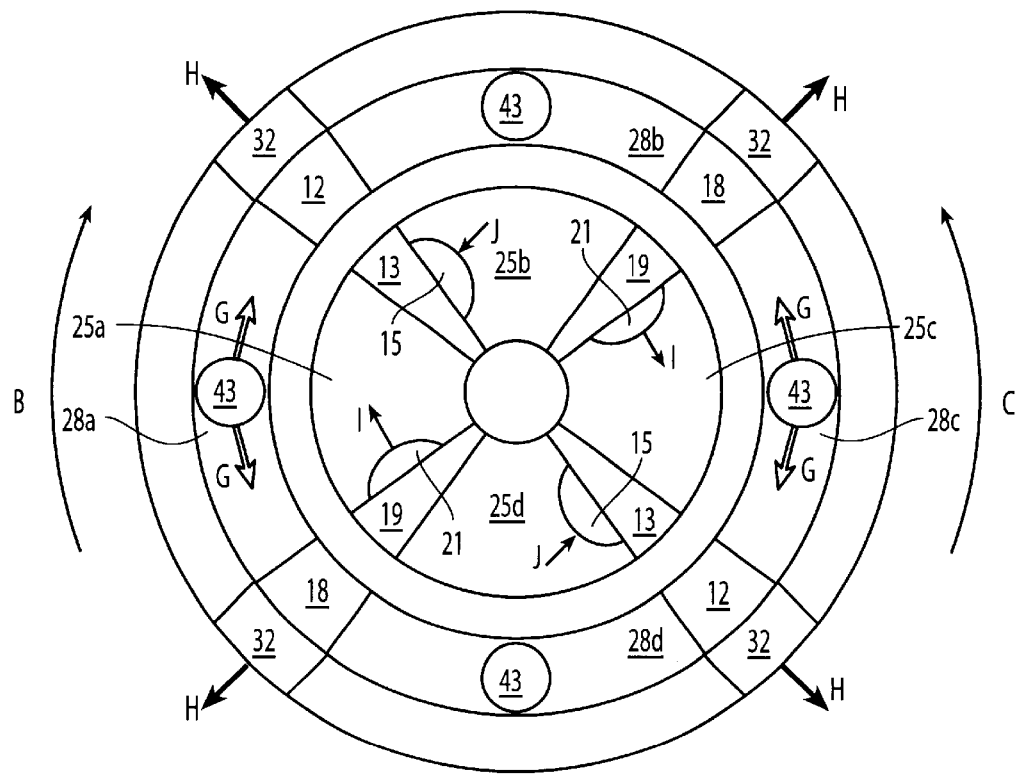
FIG. 19 is a later schematic representation of the engine of FIG. 18.
Figure 20:
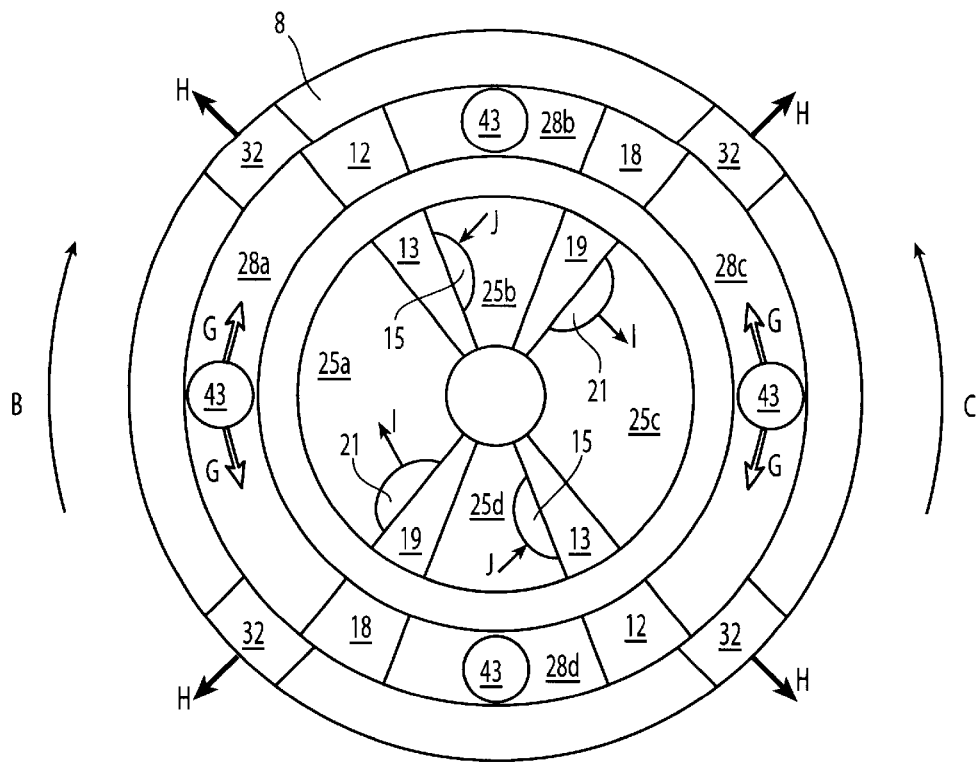
FIG. 20 is a later schematic representation of the engine of FIG. 19.
Figure 21:
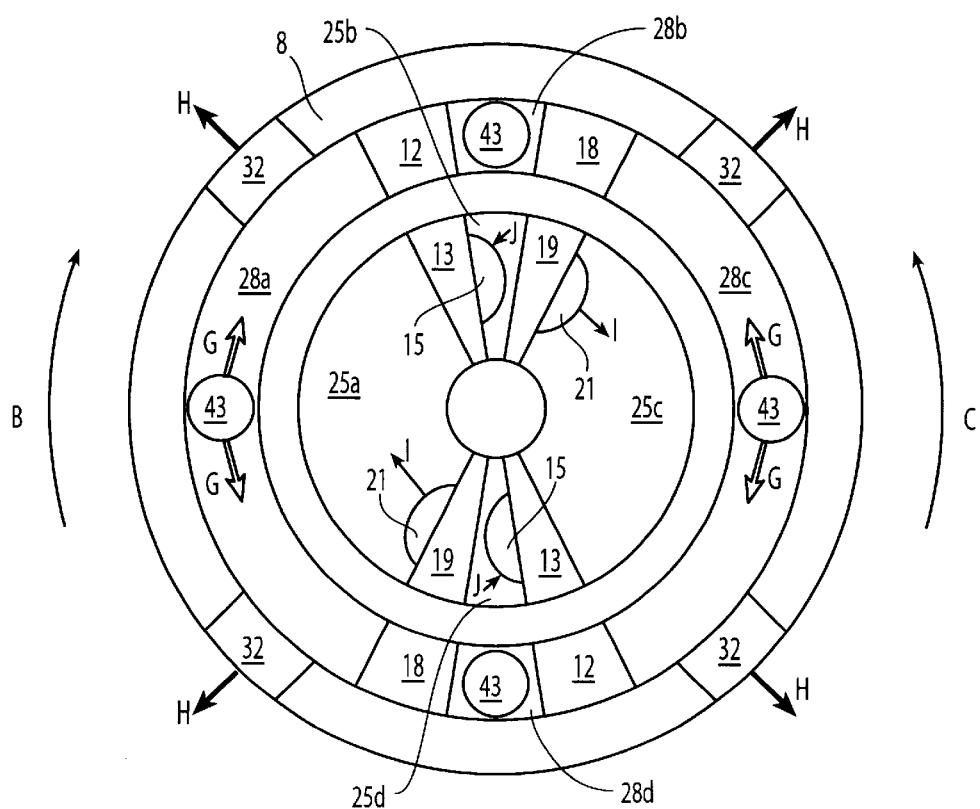
FIG. 21 is a later schematic representation of the engine of FIG. 20.

As is shown in FIG. 19, the pistons 12, 18 will rotate into alignment with the exhaust ports, sealing and trapping the air-fuel mixture in combustion chamber portions 28b and 28d. As the intake ports 43 in these combustion chambers close completely, the air-fuel mixture begins to compress with decreasing volume. This is the mid-cycle position, and the pistons 12, 18 are rotating at maximum velocity. In FIG. 20, the pistons 12, 18 continue to rotate past the exhaust ports 32, permitting the escape exhaust gases from combustion chamber portions 28a and 28c. The intake ports 43 in combustion chamber portions 28a and 28c open to introduce a fresh air and fuel mixture. In FIG. 21, the compression of the air fuel mixture will continue in combustion chamber portions 28b and 28d as the pistons 12, 18 continue to rotate away from exhaust ports 32 and slow down as before. Again, once sufficient compression is achieved, the mixture will compression ignite, reversing the process once again.

One full cycle creates two exhaust pulses, each of which occur simultaneously in all four exhaust ports. One full cycle creates an intake pulse in two opposite intake ports 43 simultaneously, then another pulse in the other two intake ports 43 simultaneously. One full cycle creates four combustion processes, thereby four power strokes. The pistons that define a combustion chamber therebetween travel faster during compression and slower during expansion of that combustion chamber. This results in a slower expansion cycle than in conventional combustion engines, creating a longer retention of the exhaust gases, more efficient and thorough ignition of combustion gases, and lower exhaust gas emissions.

Any stochiometrically reasonable mixture ratio of air to fuel will compression ignite if compressed quickly and to a high enough compression ratio. This non-fixed compression ratio or free piston feature of the engine 1 allows the combustion process to operate with differing fuels and non-ideal mixture ratios. In the event that no fuel is introduced, benign gasses (such as air) will still prevent the volume to go to zero, preventing a rotor-to-rotor crash. In such an instance the combustion pistons will "bounce" apart without contact due to a cushion created by the contained gas spring. For this reason the approaching faces of any two piston preferably create as much contact area as possible, as described above, with no protruding features to initiate piston-to-piston contact. This is a self-protecting feature which allows the engine to be stopped by turning off the fuel delivery.

Suitable fuels to be used in the present invention include fuels that ignite under compression, such as gasoline, diesel fuel, methanol, kerosene, and combinations thereof. Further the free piston configuration permits the type of fuel being consumed to be exchanged without modifications with the engine continuously running. For example, if the engine were running on a kerosene-air mixture, the kerosene fuel could be shut off with an immediate start of a vastly different fuel, such as methanol, without the engine stopping. The hydraulic fluid pressure may need to be increased or decreased slightly to re-establish the previous cycles-per-minute (CPM) rate at which the engine was running prior to the fuel delivery substitution. The engine may operate at a steady state CPM rate for long periods of time. The speed of operation of the engine can be preferably selected to take advantage of peak power, peak fuel efficiency, or minimized exhaust emissions. There may be continuously varied throttled cycles if the working fluid is contained in a hydrostatic circuit.

One suitable fuel delivery system is a carburetor venturi delivery 82 system as shown in FIG. 22. This fuel delivery system is preferable when the operating speed of the engine is not varied with time. Another suitable type of fuel delivery system is a computer controlled fuel injection. This fuel delivery system is preferred when the engine is operated in a throttled application. Yet another suitable type of fuel delivery system is to use of the working fluid as a fuel and to allow the working fluid/fuel to seep into the combustion chamber from within the pumping chamber in controlled amounts. In this system only one fluid tank would be required for the system. Therefore, only one type of fluid needs to be maintained by the system operators. In addition, a treatment or handling system for the working or hydraulic fluid, such as filtering, could be effectively eliminated or significantly simplified, because the fluid will be consumed by the engine as it runs.

Cycles per minute rate can be determined, for example, by factors including inertia of the reciprotors and valves; inertia of the working fluid; working fluid system pressure; orifice restrictions of the working fluid through the check valves and passages; energy density of the fuel; fuel mixture; fuel delivery effectiveness and exhausting freedom (breathing); throttle position; and frictions of the seals and thrust bearings. Of course, supercharging and turbocharging are possible but significantly change the thermodynamic cycle.

Hydraulic fluid flow will pulse twice per cycle based with a frequency related to the rate of change of the pumping unit motions. Therefore, a hydraulic accumulator 83 may be connected downstream of the pump by a plurality of hydraulic pressure lines 84 to account for this pulsation as shown schematically in FIG. 14. Further, although the engine of the present invention can produce pressurized hydraulic fluid for immediate use, the hydraulic accumulator can be used to store pressurized hydraulic fluid for use later when needed. Since it is possible to pressurize the hydraulic accumulator faster then the pressurized hydraulic fluid is being used, the engine may be shut down temporarily until additional pressurized fluid is needed. Such a shut down can be accomplished by withholding the fuel delivery. Alternatively, the engine may be placed into an idle mode, to keep it running thus avoiding having to restart the engine. The power output of the engine is determined by the working fluid pressure multiplied by the working fluid flow rate, since there is no shaft work output.

If desired, the engine could be provided with a cooling system. For example, the volume in the combustion and pumping housing 8 between adjacent threaded bolt holes 67 could be utilized as coolant passages. Alternatively, an external jacket having coolant passages could be used. Since a goal of any internal combustion engine is to minimize the amount of heat escaping from the combustion chamber that is not utilized for doing appreciable work, it may be desirable to keep the heat inside the combustion chamber. Keeping the heat inside the combustion chamber would also aid the compression ignition, because heat build-up helps to initiate the burning of the air/fuel mixture. In addition, heat that is retained within the combustion chamber may cause initiation of combustion earlier in the cycle when the combustion rotors are separated further. This reduces cycle time, increasing the CPM rate; however, another result is a shorter stroke, corresponding to less volume of working fluid pumped. Therefore, in some applications, a cooling system would not be desirable. Even without a cooling system, thermal barrier composites could be used to keep the reciprotors and housing components from heating beyond acceptable material limits. If it is desired to heat up the fuel prior to delivery to the combustion chamber, then the fuel can be used as a coolant fluid.

The engine may be provided with a system to produce or generate alternating electrical power. For example, the engine may take advantage of the rotary motion by providing a moving field coil on either reciprotor shaft that extends out of the engine housing. The reciprotating motion would allow the coils to oscillate past a fixed magnet, creating an alternating current. The engine can be arranged to produce a significant portion of its power output in the form of alternating electrical current to supplement its hydraulic working fluid power output. Since the two forms of power output are sliding scale inverses of each other with the total energy of the combined power output totaling the amount for which the combustion chamber can provide, the percentage or amount of output of each type can be varied depending upon application specific needs.

As the pump chambers receive hydraulic fluid at an inlet pressure and increase the pressure of the hydraulic fluid due to the work done, the outlet of one engine may be delivered to the inlet of a second engine, further increasing the pressure in a serial staging process. Alternatively, this higher pressure can be achieved by simply reducing the proportional size of the pump chambers to the combustion chambers. Further, several engines or pumping chambers may be operated in parallel to increase the overall hydraulic fluid flow or produce variable hydraulic pressure outputs.

A mechanism may also be provided with the engine of the present invention to start the engine. A suitable starting mechanism will positively engage the reciprotors and move them to the point of compression ignition, taking into account that there is no net shaft work done and that the compression ratio (i.e., the position at which the reciprotors will initiate compression ignition) is variable. Factors affecting the compression ratio include, for example, fuel type, fuel mixture, air pressure delivered to the intake port, effectiveness of the compression seals, and initial temperature of the components.

Figure 23:
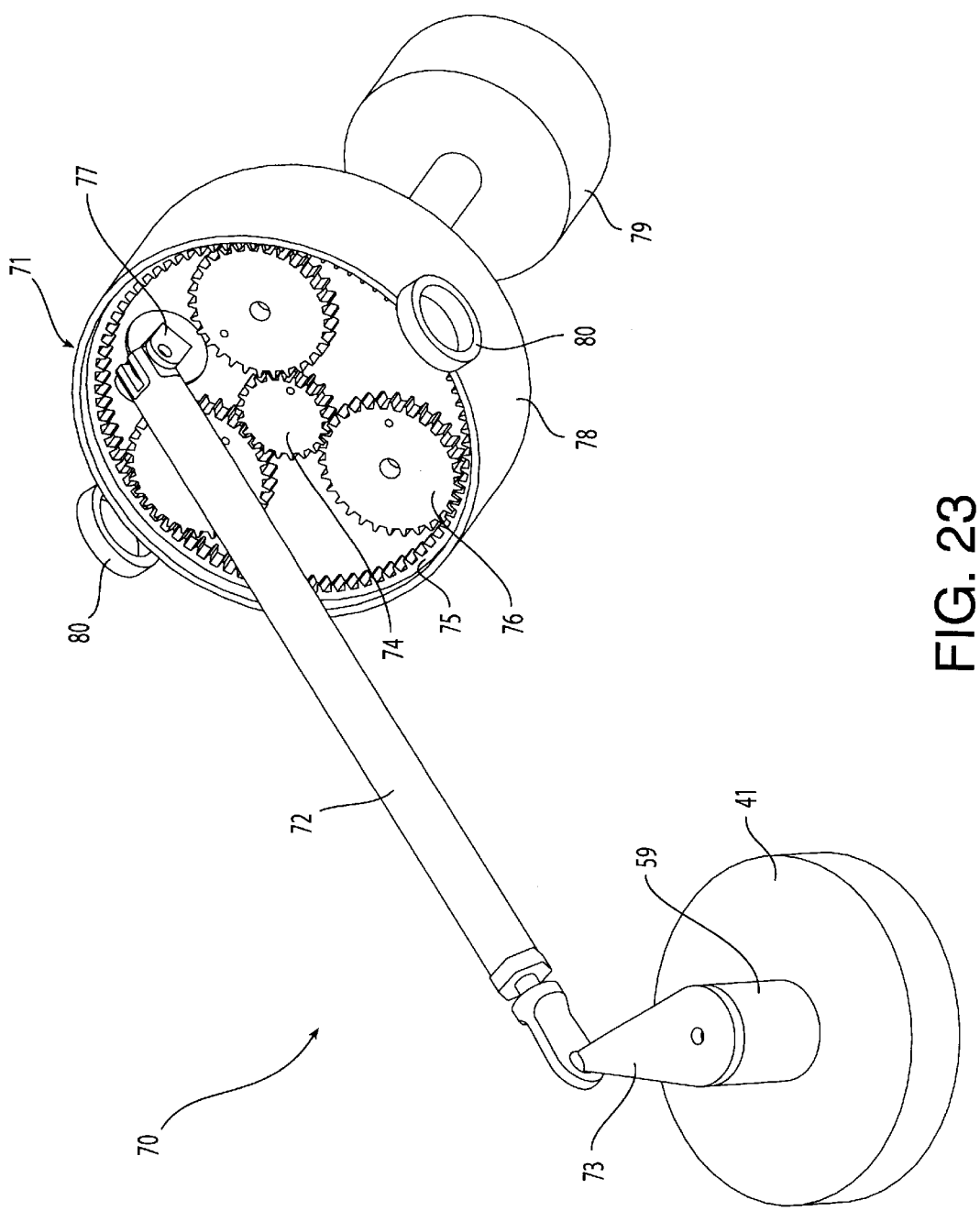
FIG. 23 is a perspective view of a starter mechanism for the engine of the present invention.

Any starter mechanism capable of beginning the reciprocating rotating motion of the engine may be used. For example, suitable starter mechanisms are described in U.S. Patent application Ser. No. 09/146,909, abandoned, the entire disclosure of which is incorporated herein by reference. As shown in FIG. 23, the starter mechanism 70 can be engaged to either one or both of the reciprotors along or in the area of the central shaft 68 or sequencing shaft 58. The starter mechanism would move the sequencing shaft 58 in a sinusoidal angular motion of smaller rotational amplitude than required to initiate compression ignition and a frequency similar to an "idle" rate of CPM. In order to lessen the load of the starter components the engine 1 may either be started "dry", with no working fluid, or the hydraulic working fluid may be cycled through the engine without any back pressure.

The starter mechanism 70 then increases the angular amplitude of the motion while keeping the frequency above the "idle" rate of CPM. As the angular amplitude increases, a point will be reached at which compression ignition initiates, and the engine will create its own self-sustaining cycle. At this point the engine will likely speed up to a CPM rate exceeding the starter frequency, reducing the load on the starter and, preferably, driving it from the engine connection. At this point the starter disengages from the engine 1 to prevent damage to the starter. The hydraulic fluid may be introduced to the pump chambers, placing a load on the engine, deriving work from the engine and preventing the possibility of a run-away cycling mode. Alternatively, if hydraulic work is not immediately required, run-away cycling could be controlled by throttling back the air-fuel mixture.

Preferably, the starter mechanism 70 is a four bar type of mechanism with a continuously rotating crank arm 71 driven so as to create continuous motion in a connected shaft. A connecting arm 72 from the rotating crank arm 71 is attached to the shaft arm 73 to drive the reciprotors. The shaft arm 73 is preferably connected to the sequencing shaft 59 by a disengageable engagement mechanism. Preferably, the engagement mechanism is a splined coupling held in engagement by a force, such as by a solenoid. The engagement mechanism is then disengaged by switching off the solenoid valve. A biasing member, such as a spring can be provided to disengage the spline coupling when the solenoid is not energized and allow the sequencing shaft 59 to rotate freely from the shaft arm 73.

The crank arm 71 includes a sun gear 74, a ring gear 75, a plurality of planetary gears 76, and a mount 77 to secure the connecting arm 72 contained within a crank housing 78. As the crank arm 71 continuously turns in complete 360 degree revolutions the connecting arm 72 reciprocally rotates the sequencing shaft 59 through an angle up to the corresponding angle of reciprocal rotation of the pistons and pump vanes, i.e. up to about 70°. The crank arm 71 is connected to and driven by a motor 79. The assembly of the crank arm 71 and the motor 79 assembly is connected to ground by means of a trunnion bearing mount 80 providing a hinge motion whose axis is horizontal and perpendicular to a line between the axis of the vertical crank axis and the vertical sequencing shaft 59 axis. There is an offset of the plane of the four bar mechanism and the axis of the trunnion mount 80 that allows the motor/crank assembly to rotate about this axis such that the motor/crank rotation axis is now pointing at the tip of the shaft arm 73. In this position the continuous rotation of the motor/crank will move the connecting arm 72 in a motion creating a cone with the tip of the cone at the attachment point of the connecting arm 72 and the shaft arm 73. Since the tip of this cone is a single point, the continuous rotation of the motor/crank assembly does not have to produce motion in the sequencing shaft 59 and hence the engine 1.

The crank arm 71 also rotates about the axis of its trunnion mount 80. As the crank arm 71 rotates about this axis, that is in and out of the horizontal plane, the sequencing arm 59 will be reciprocally rotated through an angular amplitude up to the maximum amplitude of about 70°. Eventually the combustion gases will ignite. Preferably, ignition occurs prior to reaching the maximum angular amplitude. At this point the self-sustaining cycle of the engine 1 will initiate, and the engine 1 will begin to speed away, reducing the load on the starter and increasing its speed. This reduction in load may be sensed by any means available, for example by measuring the amperage draw in the motor 79. Upon a detection of a reduction in load upon the starter, the starter will be disengaged from the sequencing shaft 59. For example, the solenoid holding securing the shaft arm 73 to the sequencing shaft 59 would be deactivated. The biasing spring would then push the splined arm out of engagement with the splined shaft by moving their mating splines apart along their common axis. At this point, the starter could be turned off, and the engine would continue to run free from the starter. The solenoid in the starter is arranged to try to engage the splines of the follower link and the splines of the reciprotor shaft in the angular positions in which they will fit together when the engine is stopped. To accomplish this, the motor/crank assembly will cycle the connecting arm 72 until the proper engagement is found. The energized solenoid will then slide the shaft arm 73 into spline engagement with the sequencing shaft 59. The shaft arm 73 will now be engaged to move the engine 1. Because the sequencing shaft 59 is connected to the fuel intake valves 53 and the synchronization shaft 24, it is also driving the intake valves 53 and reciprotors 10, 11 and providing the synchronizing function within the reciprocating rotating engine 1. Overall, the starter engages the sequencing shaft 59 in an irresistible manner, drives the reciprotors in ever increasing amounts of angular amplitude at a frequency conducive to initiation of the compression ignition cycle, and disengages when the engine combustion cycle begins.

In another embodiment, the starting mechanism utilizes the structure of an alternating power generator. Suitable generators include those described herein. If the stationary magnets of the alternator system are affixed to a ring which drives around the axis of the sequencing shaft 59 and alternately pushes or pulls the field coils of a driven arm attached to the sequencing shaft 59 with proper timing and sufficient electromagnetic force, the compression ignition cycle of the engine could be initiated. Once the engine starts, the ring containing the permanent magnets returns to a position that places the permanent magnets in a mid-position of the oscillating path of the driven arm with the field coil. Therefore, the starter double as an alternator, reducing engine cost and size.

While the present invention has been described and illustrated herein with respect to the preferred embodiments, it should be apparent that various modifications, adaptations and variations may be made utilizing the teachings of the present disclosure without departing from the scope of the invention and are intended to be within the scope of the present invention.

What is claimed is:

1. A reciprocating rotating internal combustion engine for producing direct hydraulic work, comprising:

A) a cylindrical combustion assembly housing having an outer housing radius;

B) a combustion chamber disposed within the combustion housing;

C) at least two pairs of free pistons disposed within the combustion chamber and dividing the combustion chamber into at least four combustion chamber portions that are disposed in a first ring that is concentric with the combustion housing and is disposed within the outer housing radius, the free pistons moveable between first piston positions and second piston positions;

D) a pumping assembly housing;

E) a pumping chamber disposed within the pumping housing; and

F) at least two pairs of pump vanes;
  i) disposed within the pumping chamber;
  ii) dividing the pumping chamber into at least four pumping chamber portions that are disposed in a second ring;
    a) concentric with the combustion housing; and
    b) disposed within the first ring;
  iii) coupled to the free pistons such that each pair of pump vanes is coupled to one pair the free pistons to form combined piston pump pairs, each combined pair aligned along a common diameter of the combustion housing and rotatable with respect to an axis of common rotation; and
  iv) moveable between first pump positions and second pump positions corresponding to the first and second piston positions respectively;

G) wherein:
  i) the at least four combustion chamber portions and pumping chamber portions are disposed between adjacent pistons and pump vanes respectively;
  ii) the pairs of pistons reciprocally rotate with respect to one another so as to sequentially compress and expand the combustion chamber portions in pairs disposed on either side of each piston under a combustion event force in two of the combustion chambers; and
  iii) the pump vanes reciprocally rotate with respect to one another so as to sequentially intake and pressurize the working fluid in pump chamber portions disposed on either side of each pump vane.

2. The engine of claim 1, wherein each pump vane comprises at least one check valve such that as the pump vanes rotate the check valve directs hydraulic fluid either alternatively into pumping chamber portions disposed on either side of each pump vane or out of pumping chambers portions disposed on either side of each pump vane.

3. The engine of claim 1, wherein each piston reciprocally rotates within the combustion chamber through an angle of up to about 70°.

4. The engine of claim 3 further comprising one exhaust port per combustion chamber portion and one combustion chamber intake port per combustion chamber portion, wherein the exhaust ports are equally spaced around the combustion chamber at an angular separation of up to about 90°, each intake port is equally spaced around the combustion chamber at an angular separation of up to about 90°, and the exhaust and intake ports are equally spaced from one another by an angle of up to about 45°.

5. The engine of claim 4 wherein:
  A) each intake port includes a valve;
  B) at least one of the combined pairs is connected to a sequencing shaft; and
  C) the sequencing shaft and the valves are operatively connected so as to synchronize the rotation of the pistons and the opening and closing of the intake valves.

6. The engine of claim 5 wherein movement of the pistons from the first positions to the second positions and back to the first positions defines a cycle and each cycle comprises two strokes and at least four power strokes.

* * * * *